United States Patent
Tanaka et al.

(10) Patent No.: US 8,305,668 B2
(45) Date of Patent: Nov. 6, 2012

(54) RECORDING AND REPRODUCING DEVICE, RECORDING AND REPRODUCING METHOD, RECORDING DEVICE, RECORDING METHOD, REPRODUCING DEVICE AND REPRODUCING METHOD

(75) Inventors: Kenji Tanaka, Tokyo (JP); Atsushi Fukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 641 days.

(21) Appl. No.: 12/439,839

(22) PCT Filed: May 1, 2008

(86) PCT No.: PCT/JP2008/058353
§ 371 (c)(1),
(2), (4) Date: Mar. 4, 2009

(87) PCT Pub. No.: WO2009/008208
PCT Pub. Date: Jan. 15, 2009

(65) Prior Publication Data
US 2009/0268268 A1    Oct. 29, 2009

(30) Foreign Application Priority Data
Jul. 12, 2007 (JP) ................................ 2007-182803

(51) Int. Cl.
G02B 5/32 (2006.01)
(52) U.S. Cl. .......................................... 359/21; 359/32
(58) Field of Classification Search .................... None
See application file for complete search history.

(56) References Cited

U.S. PATENT DOCUMENTS

| | | |
|---|---|---|
| 2004/0100892 A1 | 5/2004 | Horimai |
| 2005/0134948 A1 | 6/2005 | Waldman et al. |
| 2007/0146846 A1 | 6/2007 | Yasuda et al. |
| 2007/0147801 A1 | 6/2007 | Yasuda et al. |
| 2009/0021815 A1 | 1/2009 | Waldman et al. |
| 2010/0097675 A1 | 4/2010 | Waldman et al. |

FOREIGN PATENT DOCUMENTS

| | | |
|---|---|---|
| EP | 1 306 732 A1 | 5/2003 |
| EP | 1 801 794 A2 | 6/2007 |
| JP | 2000 228089 | 8/2000 |
| JP | 2003 178484 | 6/2003 |
| JP | 2007 79438 | 3/2007 |

OTHER PUBLICATIONS

European Search Report issued Aug. 24, 2011, in Patent Application No. 08740992.6.
Japanese Office Action mailed Mar. 21, 2012 in Japanese Patent Application No. 2007-182803 filed Jul. 12, 2007.
Office Action mailed Jul. 10, 2012 in Japanese Patent Application No. 2007-182803 filed Jul. 12, 2007.

*Primary Examiner* — Derek S Chapel
(74) *Attorney, Agent, or Firm* — Oblon, Spivak, McClelland, Maier & Neustadt, L.L.P.

(57) ABSTRACT

A technique for recording data onto a hologram recording medium using spatial light phase modulation corresponding to the recording data, and a technique for reproducing recorded data by properly reading information on phases recorded on a hologram recording medium. A signal beam having a phase modulation pattern corresponding to recording data and a reference beam having a specific phase modulation pattern are applied to the recording medium. Thus, recording data can be recorded onto the hologram recording medium using phase information. In addition, at the time of reproduction, a reference beam and a direct current (DC) beam, whose phase difference with respect to the reference beam is $\pi/2$, are applied to the hologram recording medium. By reading the reproduction beam to which the DC beam is added, recorded information on phases can be correctly read, and recorded data can be reproduced in accordance with the phase information.

18 Claims, 20 Drawing Sheets

FIG. 2
(a)
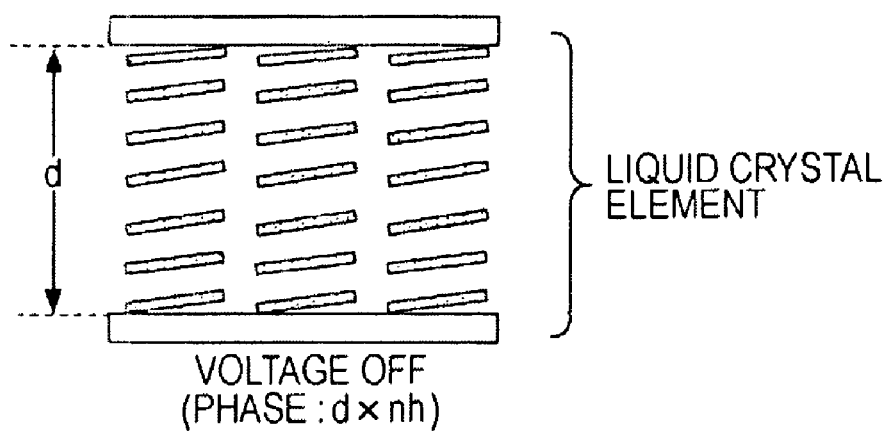
VOLTAGE OFF
(PHASE : d × nh)
(b)
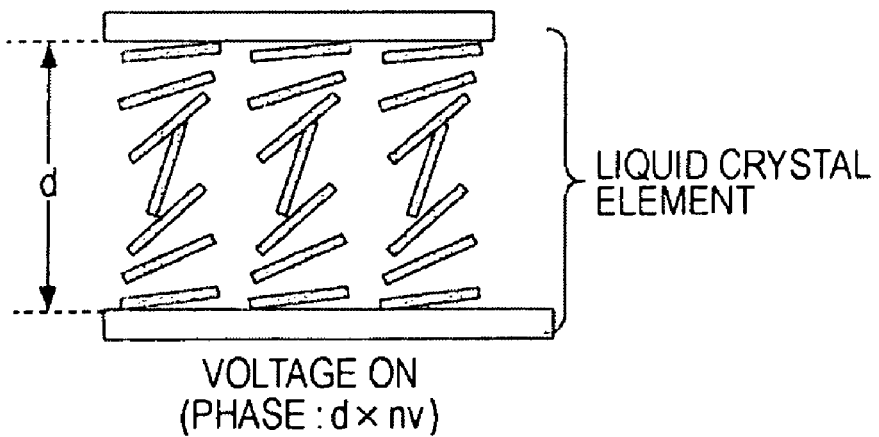
VOLTAGE ON
(PHASE : d × nv)

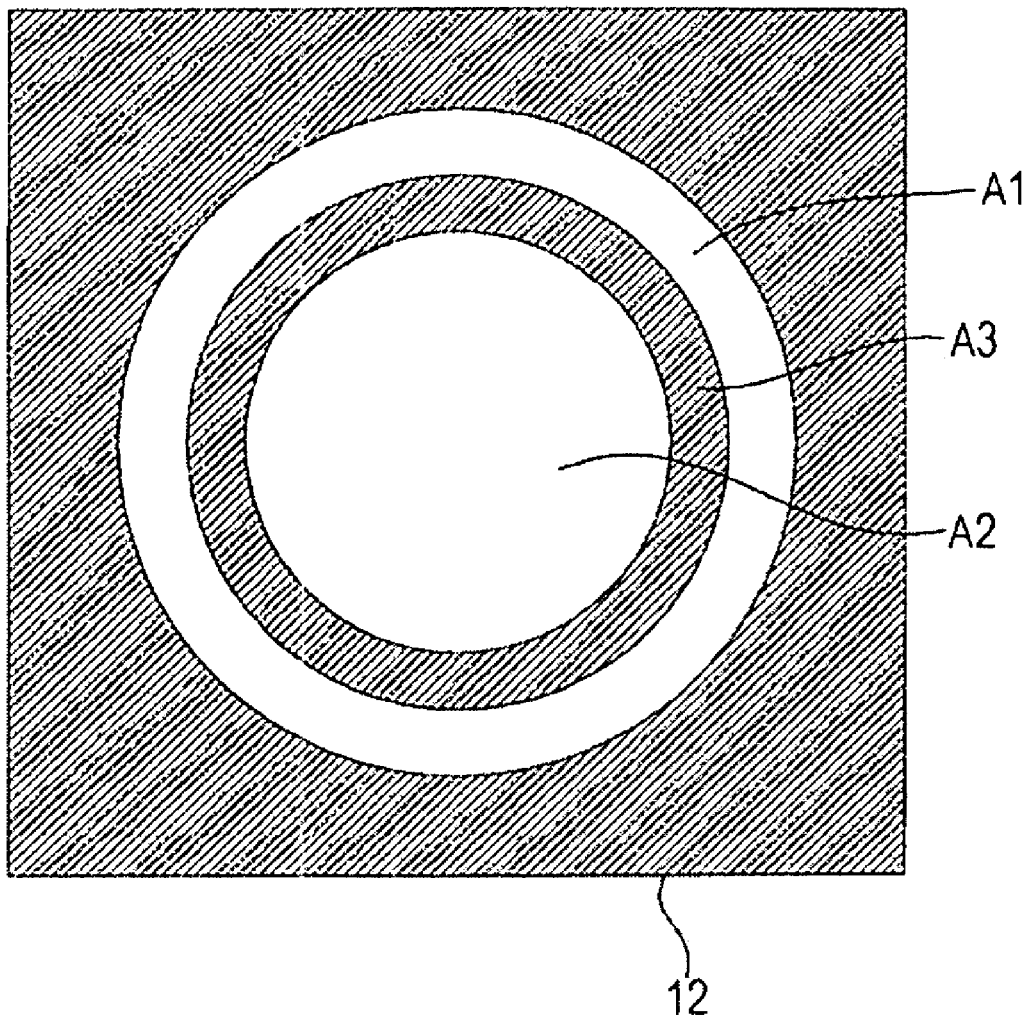

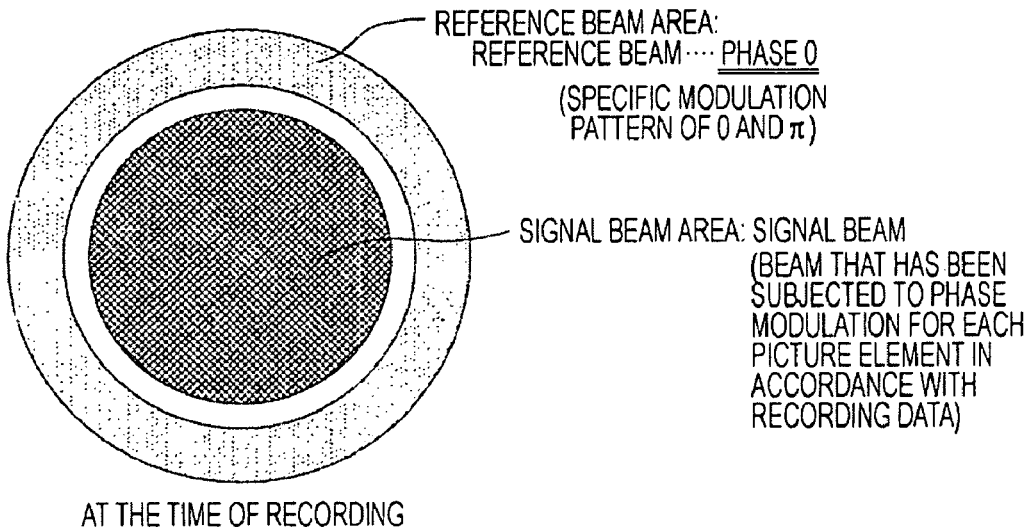

REFERENCE BEAM AREA:
  REFERENCE BEAM ···· PHASE 0
    (SPECIFIC MODULATION
    PATTERN OF 0 AND π)

SIGNAL BEAM AREA: SIGNAL BEAM
    (BEAM THAT HAS BEEN
    SUBJECTED TO PHASE
    MODULATION FOR EACH
    PICTURE ELEMENT IN
    ACCORDANCE WITH
    RECORDING DATA)

AT THE TIME OF RECORDING (b)

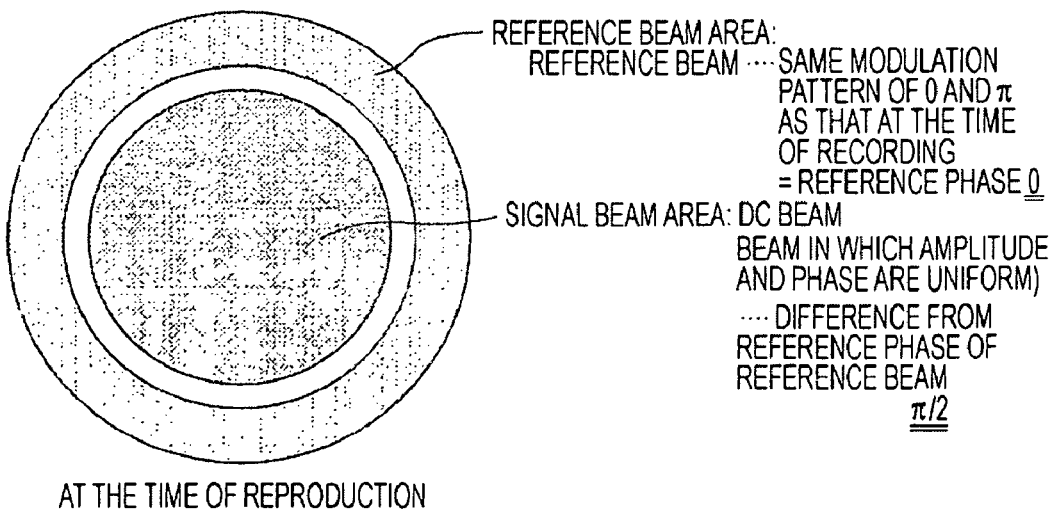

REFERENCE BEAM AREA:
  REFERENCE BEAM ···· SAME MODULATION
    PATTERN OF 0 AND π
    AS THAT AT THE TIME
    OF RECORDING
    = REFERENCE PHASE 0

SIGNAL BEAM AREA: DC BEAM
    (BEAM IN WHICH AMPLITUDE
    AND PHASE ARE UNIFORM)
    ···· DIFFERENCE FROM
    REFERENCE PHASE OF
    REFERENCE BEAM
    $\pi/2$

AT THE TIME OF REPRODUCTION

FIG. 11
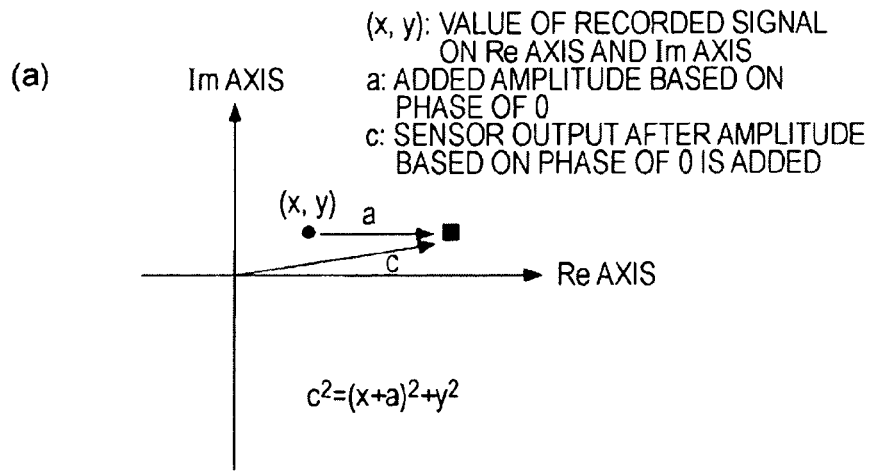
ADD AMPLITUDE a BASED ON PHASE OF 0 TO SIGNAL HAVING DESIRED PHASE
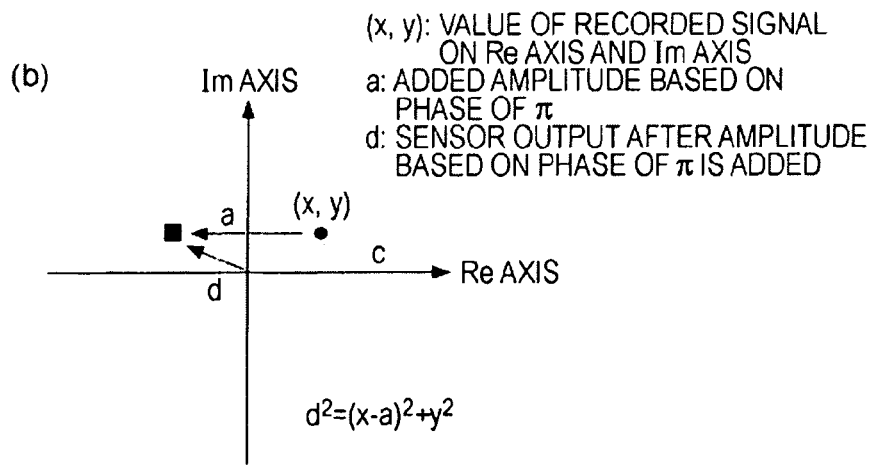
ADD AMPLITUDE a BASED ON PHASE OF $\pi$ TO SIGNAL HAVING DESIRED PHASE

FIG. 14

| DATA PATTERN OF BINARY DATA SEQUENCE | DC-FREE PATTERN OF "0" AND "π" |
|---|---|
| 11 | 00ππ |
| 10 | 0π0π |
| 01 | 0ππ0 |
| 00 | π00π |

RECORDING AND REPRODUCING DEVICE, RECORDING AND REPRODUCING METHOD, RECORDING DEVICE, RECORDING METHOD, REPRODUCING DEVICE AND REPRODUCING METHOD

TECHNICAL FIELD

The present invention relates to a recording and reproducing device that performs recording and reproduction onto and from a hologram recording medium on which data is recorded by using interference fringes between a reference beam and a signal beam and to a method for the recording and reproducing device. In addition, the present invention relates to a recording device that performs recording onto a hologram recording medium, to a method for the recording device, to a reproducing device that performs reproduction, and to a method for the reproducing device.

BACKGROUND ART

In a hologram recording and reproducing method, in particular, in a hologram recording and reproducing method in the area of an optical storage system, intensity modulation is caused to be performed on a signal beam so that a pattern arrangement of bits of 1 (for example, light intensity=high) and bits of 0 (for example, light intensity=low) can be obtained by using a spatial light intensity modulator (also simply referred to as an intensity modulator), such as, for example, a transmission-type liquid crystal panel or a DMD (Digital Micromirror Device: registered trademark), as a spatial light modulator. In addition, a beam (called a signal beam) generated by performing intensity modulation as described above and a reference beam, which is different from the signal beam, are caused to be applied to a hologram recording medium so that data recording is performed by using interference fringes between the signal beam and the reference beam (Japanese Unexamined Patent Application Publication No. 2007-79438).

As such a hologram recording and reproducing method, a coaxial method for arranging a signal beam and a reference beam along the same axis and applying the signal beam and the reference beam to a medium exists.

FIG. 18 shows an example of the configuration of a hologram recording and reproducing device employing a conventional coaxial method. Note that, in FIG. 18, only the configuration of an optical system of the recording and reproducing device is mainly extracted and shown and the other portions are omitted.

In FIG. 18, the configuration of a recording and reproducing device that corresponds to a reflection-type hologram recording medium provided with a reflection film, as a hologram recording medium, is exemplified.

First, a laser diode (LD) 101 is provided as a light source, in order to acquire laser beams for recording and reproduction. As the laser diode 101, for example, a laser diode provided with an external resonator is adopted, and the wavelength of the laser beam is set, for example, to 410 nanometers.

Emission light from the laser diode 101 passes through a collimator lens 102, and then is made incident on an SLM intensity modulator 103.

The intensity modulator 103 is constituted by, for example, a transmission-type liquid crystal panel or the like. The intensity modulator 103 is configured such that each picture element is controlled to be driven in accordance with a driving signal from a driving circuit, which is not illustrated, and the intensity modulator 103 thus performs, on incident light, spatial light intensity modulation (also simply referred to as intensity modulation) corresponding to recording data. Specifically, the intensity modulator 103 is configured so as to be capable of performing ON/OFF control of light for each picture element (for each pixel) in such a manner that, for example, a picture element that is turned ON in accordance with a driving signal transmits incident light and a picture element that is turned OFF in accordance with a driving signal does not transmit incident light. Due to such ON/OFF control by the intensity modulator 103, it is configured such that data of "0" or "1" can be recorded for each picture element (pixel).

Light that has been subjected to spatial light modulation by the intensity modulator 103 passes through a polarizing beam splitter 104, and then passes through a relay lens optical system constituted by a relay lens 105→a light-shielding mask 106→a relay lens 107. Furthermore, after passing through a ¼-wavelength plate 108, the light is converged onto an objective lens 109 and is applied to a hologram recording medium 110.

Here, at the time of recording, a signal beam that has been subjected to spatial light intensity modulation corresponding to recording data by the intensity modulator 103 as described later and, for example, a ring-shaped reference beam that is concentric with respect to the signal beam are generated. That is, the signal beam and the reference beam generated as described above are caused to be converged onto the hologram recording medium 110 through the path explained above.

Meanwhile, at the time of reproduction, light from the laser diode 101 is made incident on the intensity modulator 103 through the collimator lens 102, similarly to the time of recording. The intensity modulator 103 is configured to perform intensity modulation for reproduction on the incident light to generate only a reference beam, at the time of reproduction. That is, at the time of reproduction, it is configured such that a signal beam is not generated and only a reference beam is applied to the hologram recording medium 110.

In accordance with application of the reference beam, diffracted light corresponding to recorded data on the hologram recording medium 110 is acquired, as described later. The diffracted light, serving as reflected light from the hologram recording medium 110, passes through the objective lens 109, and then is guided to the polarizing beam splitter 104 through the ¼-wavelength plate 108→the relay lens 107→the light-shielding mask 106→the relay lens 105. The reflected light guided through the above-mentioned path from the hologram recording medium 110 is reflected in the polarizing beam splitter 104, and the reflected light is guided to an image sensor 111, as shown in the figure.

The image sensor 111 includes an imaging element, such as, for example, a CCD (Charge Coupled Device) sensor or a CMOS (Complementary Oxide Semiconductor) sensor. The image sensor 111 receives the reflected light (diffracted light) guided as described above from the hologram recording medium 110, and converts the reflected light into an electric signal.

FIG. 19 and FIG. 20, which will be provided next, are illustrations for explaining basic operations of hologram recording and reproduction implemented by the configuration of the optical system explained above. FIG. 19 and FIG. 20 show operations at the time of recording and at the time of reproduction, respectively.

Note that, in FIG. 19, only the intensity modulator 103 and the objective lens 109 of the optical system shown in FIG. 18 are extracted and shown. In addition, in FIG. 20, in part (a) of FIG. 20, similarly, only the intensity modulator 103 and the objective lens 109 are shown, and in part (b) of FIG. 20, only the objective lens 109 and the image sensor 111 are extracted and shown.

First, at the time of recording shown in FIG. 19, the intensity modulator 103 performs intensity modulation on incident light so that the above-described reference beam and a beam (signal beam) having a light intensity pattern provided thereto based on a data pattern using "0" and "1" on the basis of recording data are arranged concentrically with respect to each other.

The light that has been subjected to intensity modulation (that is, the reference beam and the signal beam) is converged onto the hologram recording medium 110 through the objective lens 109, and the thus formed interference fringes between the reference beam and the signal beam are recorded as data onto the hologram recording medium 110.

In addition, at the time of reproduction, first, as shown in part (a) of FIG. 20, only a reference beam is generated by intensity modulation on incident light performed by the intensity modulator 103 and the reference beam is caused to be converged onto the hologram recording medium 110. On this occasion, the converged light is diffracted by interference fringes corresponding to a data pattern recorded on the hologram recording medium 110 and is output as reflected light from the hologram recording medium 110. That is, the diffracted light has a light intensity pattern reflecting recorded data, as shown in part (b) of FIG. 20, and it is configured such that data reproduction is performed on the basis of a result of detection of an intensity pattern of the diffracted light by the image sensor 111.

Here, as described above, the intensity modulator 103 is configured to generate a reference beam and/or a signal beam in accordance with the time of recording/reproduction. Thus, in the intensity modulator 103, a reference beam area A1, a signal beam area A2, and a gap area A3 are set, as shown in FIG. 21, which will be provided next. That is, as shown in FIG. 21, an area having a specific round shape including a central part of the intensity modulator 103 is defined as the signal beam area A2. In addition, for a peripheral portion of the signal beam area A2, across the gap area A3, the reference beam area A1 having a ring shape that is concentric with respect to the signal beam area A2 is defined.

In addition, the above-mentioned gap area A3 is defined as an area for allowing a reference beam to avoid becoming noise due to leakage into the signal beam area A2.

At the time of recording, by setting predetermined picture elements within the reference beam area A1 to "1" (light intensity=high), setting the other picture elements within the reference beam area A1 to "0" (light intensity=low), setting all of the gap area A3 and an area that is more outward than the reference beam area A1 to "0", and causing each picture element within the signal beam area A2 to have a pattern of "0" or "1" corresponding to recording data, a reference beam and a signal beam shown in FIG. 19, which has been provided above, can be generated and output.

In addition, at the time of reproduction, by causing the reference beam area A1 to have the same pattern of "0" and "1" as that at the time of recording and setting all the other areas to bits of "0", only a reference beam can be generated and output, as shown in part (a) of FIG. 20.

As described above, in the conventional hologram recording and reproducing method, the intensity of light is controlled in accordance with recording data to generate a signal beam, and data recording onto the hologram recording medium 110 is performed.

However, it is known that not only information on amplitudes but also information on phases can be recorded onto a hologram recording medium on which data recording is performed by using interference fringes by interference of two beams, a reference beam and a signal beam. In the present situation, it is configured such that recording data is recorded in accordance with information on light intensity by performing only modulation of light intensity corresponding to the recording data as described above and recorded data is reproduced, at the time of reproduction, by reading only recorded information on the light intensity. That is, as is clear from the above description, the fact that phase information can be recorded is not effectively utilized.

DISCLOSURE OF INVENTION

Thus, in the present invention, in view of the above problem, a recording and reproducing device is configured as described below.

That is, a recording and reproducing device according to the present invention is a recording and reproducing device for performing recording and reproduction onto and from a hologram recording medium on which data is recorded by using interference fringes between a reference beam and a signal beam, and includes, first, phase modulation means configured to include at least a phase modulator performing spatial light phase modulation for incident light on a picture element-by-picture element basis and having a signal beam area serving as an area for generating the signal beam and a reference beam area serving as an area for generating the reference beam set therein and to be capable of providing a phase difference between a beam passing through the reference beam area and a beam passing through the signal beam area.

In addition, the recording and reproducing device includes an optical system for guiding light emitted from a light source and obtained through the phase modulation means to the hologram recording medium.

Furthermore, the recording and reproducing device includes phase control means, serving as phase control means for performing control for the phase modulator, for performing, at a time of recording, drive control of individual picture elements of the phase modulator in such a manner that a phase modulation pattern within the signal beam area is set to a pattern corresponding to recording data and a phase modulation pattern within the reference beam area is set to a specific pattern and for performing, at a time of reproduction, drive control of the individual picture elements in such a manner that a phase difference of $\pi/2$ is provided as a phase difference between an entire phase of a DC beam emitted from the phase modulation means through the signal beam area and a reference phase within a reference beam emitted from the phase modulation means through the reference beam area.

As described above, in the present invention, at the time of recording, it is configured such that a signal beam having a phase modulation pattern provided thereto corresponding to recording data and a reference beam having a specific phase modulation pattern provided thereto are applied to a hologram recording medium. Thus, recording data can be recorded onto the hologram recording medium in accordance with information on phases.

In addition, at the time of reproduction, it is configured such that a reference beam and a DC beam having the entire phase whose phase difference with respect to a reference phase within the reference beam is $\pi/2$ are applied to the hologram recording medium.

Here, as also described later, information on phases recorded on a hologram recording medium cannot be properly read by applying only a reference beam as in a conventional case. Thus, as described above, it is configured such that a DC beam obtained through a signal beam area (a coherent beam in which the amplitude and phase are uniform), as well as a reference beam, is applied. Thus, the above-mentioned DC beam can be added to a reproduction beam obtained from the hologram recording medium in accordance with application of the reference beam. By reading the reproduction beam to which the DC beam is added as described above, the recorded information on phases can be properly read.

In addition, as also described later, in order to correctly add the above-mentioned DC beam to the above-mentioned reproduction beam obtained in accordance with application of a reference beam, the reference phase within the reproduction beam (the phase of a portion where a phase of "0" is recorded) and the phase of the DC beam must be the same. Meanwhile, in a hologram recording and reproducing method, the phase of the reproduction beam should be shifted by $\pi/2$ with respect to the phase of a reference beam (the reference phase within the reference beam), which is applied in order to obtain the reproduction beam. In consideration of the above description, in the present invention, the phase of the DC beam is set to exhibit a phase difference of $\pi/2$ with respect to the reference phase within the reference beam, as described above. Thus, the DC beam can be properly added to the reproduction beam.

Here, in the present invention, the reference phase within the reference beam indicates the phase of a beam passing through a picture element having a phase of "0" provided thereto by the phase modulator when a phase modulation pattern of a reference beam is provided at the time of recording. For example, in a case where the same phase modulation pattern is provided to a reference beam at the time of recording and at the time of reproduction, the phase of a beam passing through a picture element having a phase of "0" provided thereto by the phase modulator when a phase modulation pattern of a reference beam is provided at the time of reproduction is used.

As described above, according to the present invention, by performing spatial light phase modulation as spatial light modulation corresponding to recording data, a recording technique for performing data recording onto a hologram recording medium in accordance with information on phases can be realized. In addition, a reproducing technique capable of correctly reading information of phases recorded as described above and reproducing recorded data can be realized.

In addition, with a configuration in which a DC beam as well as a reference beam is applied at the time of reproduction as described above, the light intensity of a reproduction beam can be increased compared with a conventional technique for applying only a reference beam. Thus, an improvement in the reproduction performance can be achieved.

BRIEF DESCRIPTION OF DRAWINGS

FIG. 2 includes illustrations for each explaining the configuration of a liquid crystal element within a phase modulator provided in the recording and reproducing device according to the first embodiment.

FIG. 3 is an illustration for explaining the configuration of a mask element.

FIG. 4 includes illustrations, as illustrations for explaining recording and reproducing operations performed by the recording and reproducing device according to the first embodiment, for exemplifying phase modulation patterns to be provided to a reference beam area and a signal beam area at the time of recording and at the time of reproduction.

FIG. 11 includes explanatory diagrams of the principle of differential detection.

FIG. 14 is an illustration, as an illustration for explaining an example of DC-free recording-modulation encoding, showing an example of the data configuration of a modulation encoding table.

BEST MODES FOR CARRYING OUT THE INVENTION

Hereinafter, best modes (hereinafter, referred to as embodiments) for carrying out the invention will be explained.

First Embodiment

Figure 1:
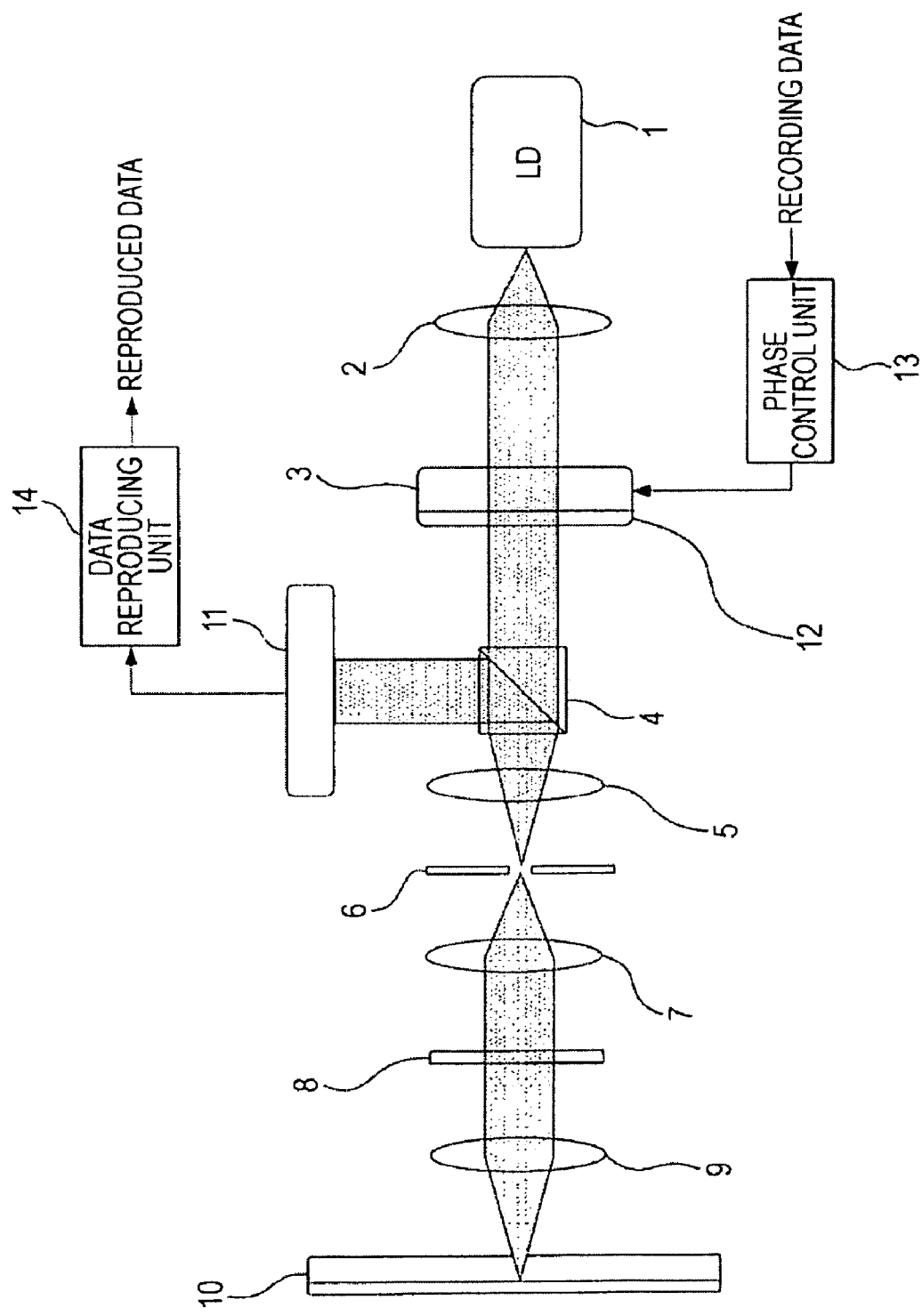
FIG. 1 is an illustration showing the internal configuration of a recording and reproducing device according to a first embodiment of the present invention.

FIG. 1 is an illustration showing the internal configuration of a recording and reproducing device according to a first embodiment of the present invention. Note that, in FIG. 1, only the configuration of an optical system of the recording and reproducing device is mainly extracted and shown and the other portions are omitted.

In this example, a case where a so-called coaxial method is adopted as a hologram recording and reproducing method will be exemplified. Note that, as described above, the coaxial method is a method for performing data recording by using interference fringes by arranging a signal beam and a reference beam coaxially and applying the signal beam and the reference beam onto a hologram recording medium set in a specific position and for acquiring a reproduction beam of data recorded by using interference fringes by applying at least a reference beam onto the hologram recording medium at the time of reproduction.

In addition, in this example, a configuration in the case corresponding to a reflection-type hologram recording medium 10 provided with a reflection film, as a hologram recording medium, will be exemplified.

In FIG. 1, first, a laser diode (LD) 1 is provided as a light source, in order to acquire laser beams for recording and reproduction. As the laser diode 1, for example, a laser diode provided with an external resonator is adopted, and the wavelength of the laser beam is set, for example, to 410 nanometers.

Emission light from the laser diode 1 passes through a collimator lens 2, and then is made incident on a phase modulator 3.

The phase modulator 3 is constituted by, for example, a transmission-type liquid crystal panel. The phase modulator 3 is configured such that each picture element is controlled to be driven in accordance with a driving signal from a phase control unit 13, which will be described later, and the phase modulator 3 thus performs, on light that passes through the phase modulator 3, spatial light phase modulation (hereinafter, also simply referred to as phase modulation) corresponding to recording data on a picture element-by-picture element basis.

The phase modulator 3 that performs phase modulation on transmission light on a picture element-by-picture element basis as described above can be realized by configuring a liquid crystal element within the above-mentioned transmission-type liquid crystal panel on the basis of the concept shown in FIG. 2, which will be provided next.

Part (a) of FIG. 2 shows a state where a driving signal (for example, a driving voltage) is not applied to the liquid crystal element within the liquid crystal panel, that is, the appearance of liquid crystal molecules in a state where the driving voltage is OFF. Part (b) of FIG. 2 shows the appearance of the liquid crystal molecules in a state where a driving voltage at a specific level is applied to the liquid crystal element (a state where the driving voltage is ON).

As shown in the figures, in the state shown in part (a) of FIG. 2 where the driving voltage is OFF, the liquid crystal molecules are arranged in a homogeneous alignment. In addition, in the state shown in part (b) of FIG. 2 where the driving voltage is ON, the liquid crystal molecules are changed into a homeotropic alignment.

Here, regarding the refractive index n of the liquid crystal element, when the refractive index at the time of the above-mentioned homogeneous alignment caused by turning OFF of the driving voltage is represented by nh and the refractive index at the time of the above-mentioned homeotropic alignment caused by turning ON of the driving voltage at the specific level is represented by nv, in a case where the thickness of the liquid crystal element is set to d, the amount of phase change produced at the time when the driving voltage is OFF is represented by "d×nh" and the amount of phase change produced at the time when the driving voltage is ON is represented by "d×nv". Thus, from the above description, a phase difference Δnd that can be provided by ON/OFF of the driving voltage is expressed as follows:

$$\Delta nd = d \times nh - d \times nv$$

As is clear from this relational expression, in order to provide a required phase difference on a picture element-by-picture element basis, the thickness d of the liquid crystal element should be adjusted.

As the phase modulator 3 used in this example, by adjusting the thickness d of the liquid crystal element, setting for obtaining, for example, the phase difference $\Delta nd = 2\pi$ is performed. That is, thus, it is configured such that by performing ON/OFF switching of the driving voltage as described above, light phase modulation based on two values "0" and "$2\pi$" can be performed for each picture element.

Here, the fact that modulation based on phases of "0" and "$2\pi$" can be performed between the time when the driving voltage is ON at the specific level and the time when the driving voltage is OFF as described above means that the phase can be changed in a stepwise manner from "0" to "$2\pi$" by controlling the level of the driving voltage to the specific level in a stepwise manner. For example, if the level of the driving voltage is set to the level that is half the specific level, modulation based on a phase of "$\pi$" can be performed. Furthermore, if the level of the driving voltage is set to the level that is one-quarter the specific level, modulation based on a phase of "$\pi/2$" can be performed.

Figure 21:
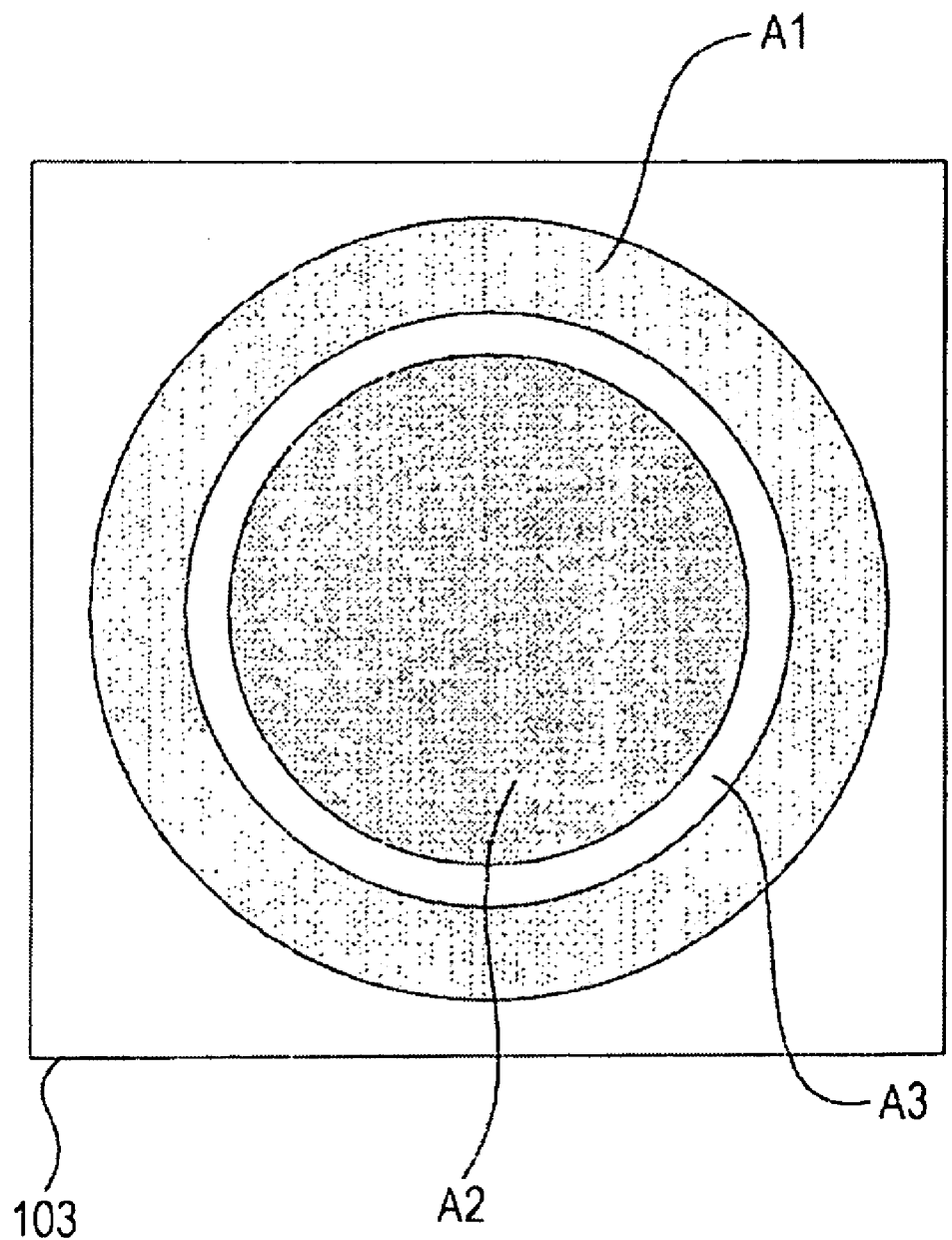
FIG. 21 is an illustration for explaining each of a reference beam area, a signal beam area, and a gap area set in an intensity light modulator.

In addition, in the phase modulator 3 in this case, in order to generate a reference beam and a signal beam as individual beams as described later, similarly to the areas shown in FIG. 21, which has been provided above, individual areas, the reference beam area A1, the signal beam area A2, and the gap area A3, are set. Specifically, regarding the phase modulator 3 in this case, a specific picture element range having a substantially round shape including a central part of the phase modulator 3 is set as the signal beam area A2, a specific picture element range having a substantially ring shape adjacent to a periphery side of the signal beam area A2 is set as the gap area A3, and furthermore, a specific picture element range having a substantially ring shape adjacent to a periphery side of the gap area A3 is set as the reference beam area A1.

Referring back to FIG. 1, the light that has been subjected to phase modulation by the phase modulator 3 as described above is output through a mask element 12 that is installed on an emission surface side of the phase modulator 3.

As shown in FIG. 3, which will be provided next, in the mask element 12, area setting of the reference beam area A1, the signal beam area A2, and the gap area A3, as in the above-mentioned phase modulator 3, is set. The mask element 12 is configured to mask (shade) the gap area A3 and an area that is more outward than the reference beam area A1. That is, thus, it is configured such that only a beam passing through the reference beam area A1 and a beam passing through the signal beam area A2 in the phase modulator 3 are transmitted. The mask element 12 is installed with respect to the phase modulator 3 in such a manner that the reference beam area A1, the signal beam area A2, and the gap area A3 in the mask element 12 correspond to the reference beam area A1, the signal beam area A2, and the gap area A3 in the phase modulator 3.

In FIG. 1, light that passes through the mask element 12 passes through a beam splitter 4, and then passes through a relay lens optical system constituted by a relay lens 5→a light-shielding mask 6→a relay lens 7. Furthermore, after passing through a ¼-wavelength plate 8, the light is converged onto an objective lens 9 and is applied to a hologram recording medium 10.

Here, at the time of recording, the phase modulator 3 performs phase modulation on incident light as described later, and the light that has been subjected to phase modulation is output through the mask element 12. Thus, a reference beam having a specific phase modulation pattern provided thereto and a signal beam having a phase modulation pattern provided thereto corresponding to recording data are obtained. Then, the signal beam and the reference beam generated as described above are converged onto the above-mentioned hologram recording medium 10 through the path explained above. Thus, data recording onto the hologram recording medium 10 is performed by using interference fringes between the reference beam and the signal beam.

Meanwhile, at the time of reproduction, light from the laser diode 1 is made incident on the phase modulator 3 through the collimator lens 2, similarly to the time of recording. The phase modulator 3 is configured, at the time of reproduction, to perform phase modulation for reproduction, as described later, on the incident light under the control of the phase control unit 13 to generate a reference beam and a DC beam. In accordance with this, it is configured such that, at the time of reproduction, the reference beam and the DC beam are applied to the hologram recording medium 10.

In accordance with application of the reference beam, a diffracted beam corresponding to interference fringes (recorded data) on the hologram recording medium 10 is obtained as a reproduction beam. The diffracted beam (reproduction beam) passes through the objective lens 9 as reflected light from the hologram recording medium 10, and then is guided to the beam splitter 4 through the ¼-wavelength plate 8→the relay lens 7→the light-shielding mask 6→the relay lens 5. In addition, the above-mentioned DC beam is also reflected at the hologram recording medium 10 and guided to the beam splitter 4 through the similar path.

The beam splitter 4 is configured to reflect the reproduction beam and the DC beam guided through the above-mentioned path, and the reflected light is guided to an image sensor 11, as shown in the figure. The image sensor 11 includes an imaging element, such as, for example, a CCD (Charge Coupled Device) sensor or a CMOS (Complementary Oxide Semiconductor) sensor. The image sensor 11 receives the reflected light (the reproduction beam and the DC beam) guided as described above from the hologram recording medium 10, and converts the reflected light into an electric signal. Thus, at the time of reproduction, a component obtained by adding the reproduction beam and the DC beam together as described later is read as an image signal by the image sensor 11.

A data reproducing unit 14 performs reproduction signal processing on the image signal (read signal) obtained by the image sensor 11 to reproduce recorded data.

Note that an operation by the data reproducing unit 14 will be described later.

FIG. 4 includes illustrations for explaining hologram recording and reproducing operations according to the first embodiment to be realized by the recording and reproducing device having the above-described configuration.

In FIG. 4, part (a) of FIG. 4 schematically shows phase modulation patterns in the phase modulator 3 at the time of recording, and part (b) of FIG. 4 schematically shows phase modulation patterns in the phase modulator 3 at the time of reproduction.

First, in part (a) of FIG. 4, at the time of recording, as shown in the figure, a specific phase modulation pattern of "0" and "π" is provided to the reference beam area A1.

In addition, a pattern of phases of "0" and "π" corresponding to recording data is provided to the signal beam area A2. Specifically, for a recording data sequence formed by a combination of two values "0" and "1", a phase modulation pattern is provided in such a manner that, for example, a phase of "0" is assigned to a bit of "1" and a phase of "π" is assigned to a bit of "0".

The phase modulator 3 is configured, at the time of recording, to perform the above-described phase modulation. Thus, a reference beam having a specific phase modulation pattern of "0" and "π" and a signal beam having a phase modulation pattern of "0" and "π" corresponding to recording data are applied to the hologram recording medium 10. Thus, data is recorded onto the hologram recording medium 10 by using interference fringes between the reference beam and the signal beam.

In this case, since the signal beam has been subjected to phase modulation based on "0" and "π" as described above, information on phases is included in the interference fringes formed as described above. That is, thus, data recording based on phase information can be achieved.

Here, in this example, since spatial light intensity modulation is not performed on a signal beam and a reference beam, the amplitudes of these beams are the uniform "1" (ON).

As described above, for example, in a case where phase modulation based on "0" is provided to a beam having an amplitude of "1" (that is, in a case where phase modulation by the phase modulator 3 is not performed), "1" is recorded onto the hologram recording medium 10 as information on the amplitude.

Meanwhile, in a case where phase modulation based on "π" (180 degrees: that is, reversed phase) is performed on a beam having an amplitude of "1", "−1" is recorded onto the hologram recording medium 10 as information on the amplitude.

As described above, in terms of the values of amplitude, information recorded by modulation based on phases of "0" and "π" represents "1" and "−1", respectively.

Here, as is understandable from this explanation, in a hologram recording and reproducing method, information on phases can be recorded on the hologram recording medium 10. However, on a reproducing side, although reading of the light intensity of a signal recorded on the hologram recording medium 10 can be performed provided that reading is performed by applying only a reference beam as in a conventional case, information on phases (that is, a difference in amplitude) cannot be correctly read. This is because a hologram recording and reproducing system has a nonlinear characteristic.

A nonlinear characteristic of such a hologram recording and reproducing system will be explained. First, including the configuration shown in FIG. 1, which has been provided above, in general, an optical system based on a hologram recording and reproducing method has a configuration based on a 4f optical system, in which an SLM (spatial light modulator), an objective lens, a medium, an eyepiece lens, and an image sensor are arranged to be individually separated by focal lengths of lenses. This is a configuration called a so-called Fourier transform hologram.

In the configuration of such a Fourier transform hologram, a series of operations of a recording and reproducing system can be regarded as follows. That is, a recording data pattern of the SLM is subjected to Fourier transform and is projected onto a hologram recording medium (medium). A read signal (reproduced image) of the medium is subjected to inverse Fourier transform and is projected onto an image sensor. Then, the image sensor is configured to detect the intensity of light as the absolute value of the amplitude of the wavefront of light input into the image sensor.

Due to a problem regarding nonlinearity of such a hologram recording and reproducing system, in a case where only a reference beam is applied at the time of reproduction as in a conventional case, a signal recorded in accordance with phase information cannot be properly read.

This will be explained with reference to FIG. 5, which will be provided next.

Figure 5:
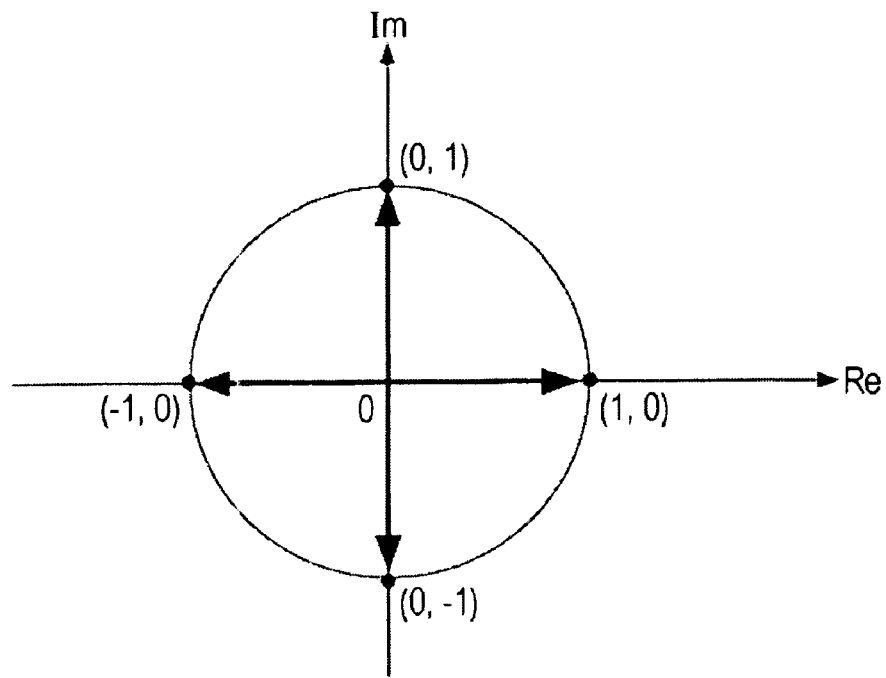
FIG. 5 is a diagram showing, by using a real axis and an imaginary axis, a signal value recorded on a hologram recording medium.

FIG. 5 represents a signal value recorded on the hologram recording medium 10 by combining a beam of a light intensity of "1" with a phase, where the abscissa (x axis) is used as a real axis Re and the ordinate is used as an imaginary axis Im.

The above-mentioned real axis Re is an axis representing phases of "0" and "$\pi$" bounded by the origin. In addition, the imaginary axis Im is an axis representing phases of "$\pi/2$" and "$3\pi/2$" bounded by the origin.

The value of a signal recorded by combining a beam having a certain intensity with a phase can be represented by coordinates (x,y), where x represents a value on the real axis Re and y represents a value on the imaginary axis Im. Specifically, a signal value recorded by combining a phase of "0" is (1,0). In addition, a signal value recorded by combining a phase of "$\pi$" is (−1,0). Furthermore, a signal value recorded by combining a phase of "$\pi/2$" is (0,1), and a signal value recorded by combining a phase of "$3\pi/2$" is (0, −1).

In addition, in a case where reading of a signal value represented by coordinates (x,y) as described above is performed by applying only a reference beam, the light intensity detected by the image sensor 11 is represented as a distance from the origin (0,0). Thus, irrespective of which phase is combined with a certain light intensity (in this case, "1") and recording is performed, the same value "1", which is the recorded light intensity, is obtained as the light intensity detected by the image sensor 11.

Thus, in this embodiment, it is configured such that, at the time of reproduction, together with a reference beam, a coherent beam (also referred to as a DC beam) that passes inside the signal beam area A2 and the amplitude and phase are uniform is applied.

Here, when it is assumed that a DC beam generated by causing the DC beam to pass through the signal beam area A2 as described above is applied, the amplitude of the DC beam can be added to a reproduction beam obtained in accordance with application of a reference beam. Specifically, if "1" can be added as the amplitude of the DC beam, for a signal having an amplitude of "1" recorded in accordance with a phase of "0", "1"+"1" can be obtained. That is, as the light intensity detected on the image sensor 11, (1+1)=2 can be detected. In addition, for a signal having an amplitude of "−1" recorded in accordance with a phase of "$\pi$", "−1"+"1" can be obtained. Thus, on the image sensor 11, the light intensity of (−1+1)=0 can be detected.

By performing reading by adding the DC beam to the reproduction beam as described above, bits of "0" and "1" recorded in accordance with phase information can be distinguished from each other. Thus, data reproduction can be correctly performed.

Figure 6:
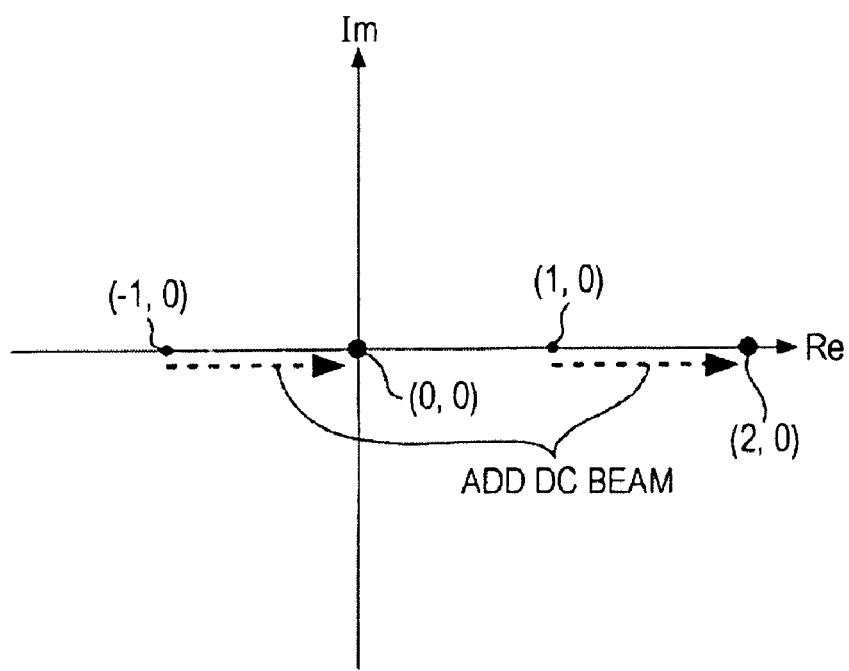
FIG. 6 is a diagram showing, by using a real axis and an imaginary axis, the state where a DC beam is added.

When the principle of addition and reading of a DC beam described above is represented by using the real axis Re and the imaginary axis Im similar to those in FIG. 5, which has been provided above, a state shown in FIG. 6, which will be provided next, can be obtained.

In FIG. 6, the fact that a DC beam based on an amplitude of "1" is added to a reproduction beam as described above means that an amplitude of "1" is added, in a direction of a phase of "0" (a forward direction on the real axis Re), to each signal value, as shown in the figure.

Thus, a signal value (1,0) recorded in accordance with a combination of an amplitude of "1" and a phase of "0" becomes (2,0), as shown in the figure, and a signal value (−1,0) recorded in accordance with a combination of an amplitude of "1" and a phase of "$\pi$" becomes (0,0). Therefore, the light intensities detected for these signal values by the image sensor 11 are "2" and "0", respectively, and the above-described results can be obtained.

A specific example of phase modulation at the time of reproduction in order to realize addition and reading of such a DC beam will be explained with reference to part (b) of FIG. 4.

First, at the time of reproduction, a phase modulation pattern within the reference beam area A1 is set to the same modulation pattern of "0" and "$\pi$" as that at the time of recording. As in this example, in a case where phase multiplexing recording in which a specific phase modulation pattern is provided to a reference beam at the time of recording is performed, by setting a phase modulation pattern of a reference beam at the time of reproduction to be the same as the phase modulation pattern of the reference beam at the time of recording as described above, a recorded signal can be correctly read.

In addition, by setting the phase modulation pattern of the reference beam at the time of reproduction to be the same as that at the time of recording as described above, the phase of the reference beam at the time of reproduction can be set to the same phase as that of the reference beam at the time of recording.

Here, in this specification, a picture element within the reference beam area A1 to which a phase of "0" is provided when a phase modulation pattern is provided at the time of recording as described above is referred to as a reference picture element. In addition, an expression "a reference phase within a reference beam" indicates the phase of a beam passing through the above-mentioned reference picture element within the reference beam area A1.

In the light of the above description, in a case where a phase modulation pattern of a reference beam at the time of reproduction is set to the same pattern as a phase modulation pattern at the time of recording as described above, the reference phase within the reference beam at the time of reproduction is "0".

In addition, in part (b) of FIG. 4, for the signal beam area A2 at the time of reproduction, the phases of the entire picture elements are set to a phase shifted by $\pi/2$ from the reference phase within the reference beam. Specifically, since the reference phase within the reference beam in this case is "0" as stated above, the phases of the entire picture elements within the signal beam area A2 are set to "$\pi/2$".

Here, according to the above explanation, in the reproducing technique in this example for performing adding and reading of a DC beam, it is necessary to add a DC beam as a component of an amplitude of "1" to a reproduction beam. To this end, the phase of the DC beam should be set so as to be the same as the phase of a portion for which a phase of "0" is recorded, where the same value of the amplitude "1" is obtained, within the reproduction beam.

In addition, as is understandable from this explanation, for execution of addition and reading of a DC beam, the phase of the DC beam to be added must be set by using, as a reference, the phase of a portion where an amplitude of "1"=a phase of "0" is recorded within a reproduction beam. In the light of the above description, in this specification, the phase of a portion where a phase of "0" is recorded within a reproduction beam as described above is referred to as a "reference phase within a reproduction beam".

Here, according to the above explanation, it is configured such that the phase of the DC beam is set to have a phase difference of "$\pi/2$" with respect to the reference phase within the reference beam. However, in this case, the reference phase of the reference beam is "0". Therefore, it is not necessarily impossible to consider that the reference phase within the reproduction beam obtained in accordance with application of the reference beam (the phase of a portion where a phase of "0" is recorded) is also "0". That is, from the above description, it is not necessarily impossible to consider that a phase to be set to the DC beam must be "0", which is the same phase as the reference phase within the reproduction beam.

However, actually, in a case where the phase of the DC beam is set to "0" as described above, the phase of the DC beam cannot be the same phase as the reference phase within the reproduction beam. This is because, as also described in Kogelnik, H "Coupled wave theory for thick hologramgrating". Bell System Technical Journal, 48, 2909-47, in a hologram recording and reproducing method, when a reference beam is applied to obtain a reproduction beam, the phase of the reproduction beam has a characteristic of being shifted by $\pi/2$ from the phase of a recorded signal. That is, in order to deal with the occurrence of a phase shift of $\pi/2$ in the reproduction beam as described above, the phase of the DC beam to be added is also set to a phase shifted by $\pi/2$.

Here, a phase relationship will be described. First, it is assumed that the phase of a portion where a phase of "0" is recorded (reference phase) within a recorded signal in a case where recording is performed in accordance with a combination of phases of "0" and "$\pi$" by applying a reference beam to which a specific phase modulation pattern has been provided as described above is "0". On this assumption, at the time of reproduction, a reference beam to which the same phase modulation pattern as that at the time of recording is applied as described above to obtain a reproduction beam. When a reference beam based on the same phase modulation pattern as that at the time of recording is applied as described above, from simple consideration, it is estimated that the reference phase of a reproduction beam obtained in accordance with the recorded signal is maintained "0". However, actually, the phase of the reproduction beam is shifted by "$\pi/2$" from the phase of the recorded signal, as described above. Thus, in order to deal with this, the phase of a DC beam is set to "$\pi/2$", as stated above. As a result, the reference phase ($\pi/2$) within the reproduction beam can be matched with the phase ($\pi/2$) of the DC beam.

Here, as for a phase relationship between the reproduction beam and the reference beam, the reference phase within the reference beam is equal to "0", whereas the reference phase of the reproduction beam is equal to "$\pi/2$". Thus, it can be understood that the reference phase within the reproduction beam is shifted by "$\pi/2$" with respect to the reference phase within the reference beam. Therefore, as stated above, the phase of the DC beam should be set so as to have a phase difference of "$\pi/2$" with respect to the reference phase within the reference beam.

Then, operations performed by the phase control unit 13 and the data reproducing unit 14 shown in FIG. 1 in order to realize recording and reproducing operations according to this embodiment explained above will be described.

Figure 7:
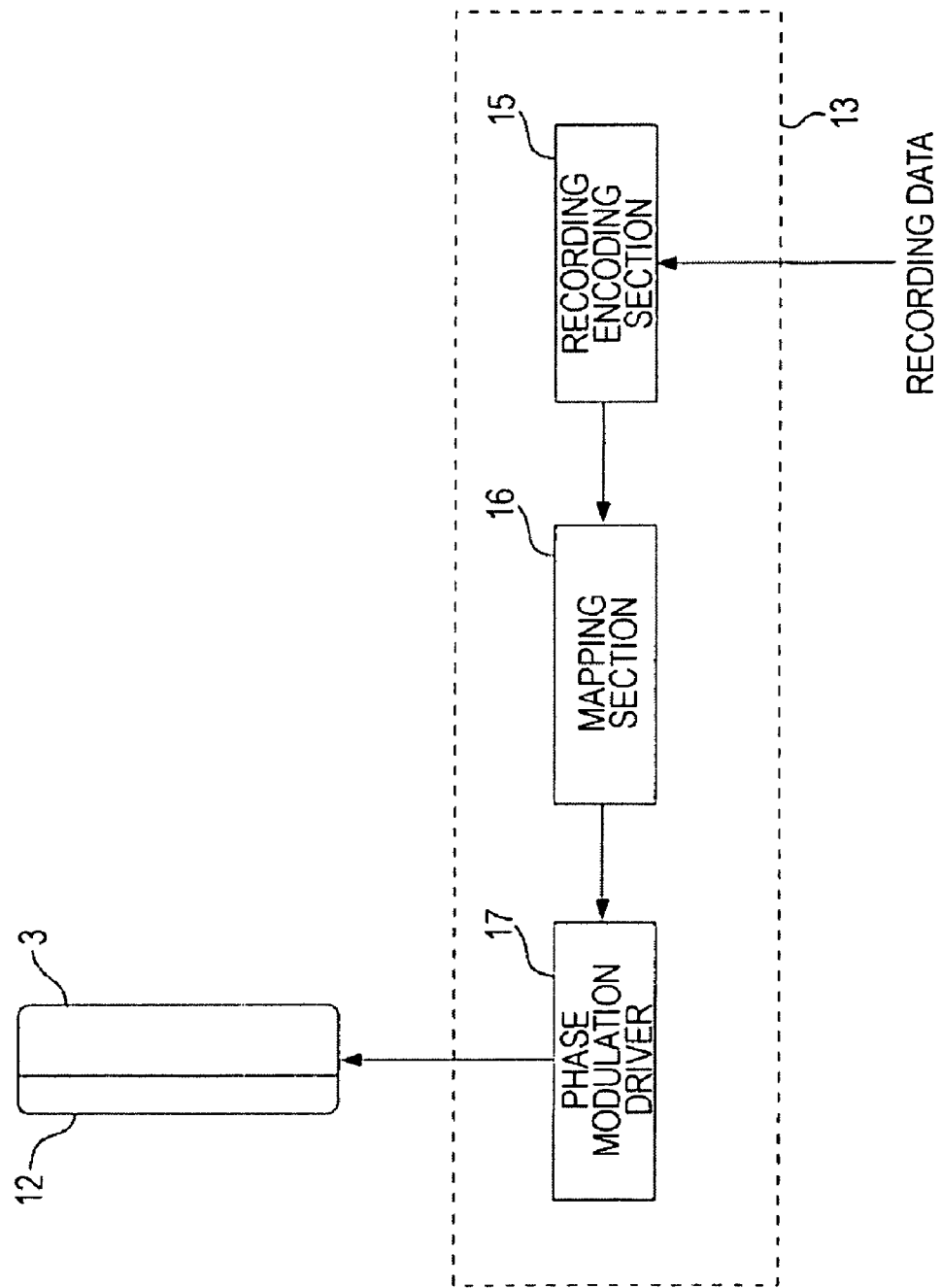
FIG. 7 is an illustration showing the internal configuration of a phase control unit provided in the recording and reproducing device according to the first embodiment.

First, regarding the phase control unit 13, the internal configuration thereof is shown in FIG. 7, which will be provided next. Note that, in FIG. 7, the phase modulator 3 and the mask element 12, which are shown in FIG. 1, which has been provided above, are shown together.

In FIG. 7, a recording encoding section 15, a mapping section 16, and a phase modulation driver 17 are provided in the phase control unit 13.

At the time of recording, recording data based on a combination of bits of "0" and "1" is supplied to the phase control unit 13, and this recording data is input to the recording encoding section 15.

The recording encoding section 15 encodes the recording data into values corresponding to phases of "0" and "$\pi$". Specifically, in this case, a value corresponding to a phase of "0" is assigned to a bit of "1" in the recording data. In addition, a value corresponding to a phase of "$\pi$" is assigned to a bit of "0".

At the time of recording, the mapping section 16 arranges the data encoded by the recording encoding section in one hologram page in accordance with a recording format. The hologram page indicates the entire data array spread within the signal beam area A2. That is, a data unit that can be recorded at once by interference between a signal beam and a reference beam is called a hologram page.

In addition, together with the mapping into the signal beam area A2, the mapping section 16 generates a data pattern in which a specific picture element of the reference beam area A1 is set to have a value corresponding to a phase of "0" and the other picture elements are set to have a value corresponding to a phase of "$\pi$", and generates, by adding this data pattern and a data pattern within the signal beam area A2 together, data patterns of the entire effective picture elements of the phase modulator 3. Then, the mapping section 16 supplies the data patterns of the entire effective picture elements to the phase modulation driver 17, and indicates driving signal levels of the individual picture elements.

Here, as described in FIG. 2, which has been provided above, the phase modulator 3 is configured so as to be capable of variably driving each picture element in accordance with the level of a driving signal. Specifically, the phase modulator 3 in this case is capable of variably modulating the phase within a range from "0" to "$2\pi$" on a picture element-by-picture element basis in accordance with the level of a driving signal. In accordance with this, the phase modulation driver 17 within the phase control unit 13 is configured to drive the individual picture elements of the phase modulator 3 in accordance with the levels of driving signals corresponding to values "0" to "1" (for example, in the case of 256 grayscale levels, 0 to 255) indicated by the mapping section 16.

The mapping section 16 and the recording encoding section 15 are configured, in accordance with this, to assign "0" as a value corresponding to the phase of "0" and assign "½" (127) as a value corresponding to the phase of "$\pi$".

The phase modulation driver 17 drives the individual picture elements of the phase modulator 3 on the basis of indicated values of driving signal levels of the individual picture elements as the data patterns supplied from the mapping section 16. Thus, the phase modulator 3 is configured, at the time of recording, to perform phase modulation on incident light in such a manner that a phase modulation pattern of "0" and "$\pi$" corresponding to a recording data is provided inside the signal beam area A2 on a picture element-by-picture element basis and a specific phase modulation pattern of "0" and "$\pi$" is provided inside the reference beam area A1 on a picture element-by-picture element basis.

In addition, although phase modulation for areas other than the reference beam area A1 and the signal beam area A2 has not been particularly described here, since the areas other than the reference beam area A1 and the signal beam area A2 are shaded by the mask element 12, no influence is imposed on the recording and reproducing operations in this example even if any phase modulation is performed on these areas. Thus, the phases of these areas can be set in a desired manner. For example, in this case, a phase of "0" is assigned to all of these areas. In addition, this is similarly applied to a case of the time of reproduction, which will be described below.

Then, operations at the time of reproduction will be described.

At the time of reproduction, within the phase control unit 13, the mapping section 16 generates data patterns for generating a DC beam and a reference beam explained in part (b) of FIG. 4, which has been provided above. Specifically, data patterns in which the reference beam area A1 has a pattern of phases of "0" and "π" (that is, "0" and "½") similar to that at the time of recording and the signal beam area A2 is filled with a value corresponding to a phase of "π/2", that is "¼" (63) are generated. Then, data patterns of the entire effective picture elements of the phase modulator 3, including the above data patterns, are supplied to the phase modulation driver 17.

Such an operation of the mapping section 16 at the time of reproduction is performed. Thus, in the phase modulator 3, with respect to incident light, the same phase modulation pattern of "0" and "π" as that at the time of recording is provided inside the reference beam area A1 on a picture element-by-picture element basis and phase modulation based on "π/2" is provided for the entire picture elements within the signal beam area A2. As a result, as emission light from the mask element 12, a reference beam based on the same phase modulation pattern as that at the time of recording described in part (b) of FIG. 4, which has been provided above, and a DC beam having a phase difference of "π/2" with respect to the reference phase within the reference beam can be obtained.

At the time of reproduction, in accordance with application of the reference beam and the DC beam, in the image sensor 11, a read signal for a component in which the reproduction beam obtained from the hologram recording medium 10 in accordance with application of the reference beam and the DC beam having the same phase as the reference phase within the reproduction beam are added together can be obtained.

The read signal obtained by the image sensor 11 is supplied to the data reproducing unit 14 shown in FIG. 1.

The data reproducing unit 14 performs data identification for identifying whether data is "0" or "1" for each value in units of picture elements (in units of data pixels) of the phase modulator 3 included in the read signal (image signal) from the image sensor 11, and reproduces data recorded on the hologram recording medium 10.

Here, as also described above, at the time of recording, a phase of "0" is assigned to a bit of "1" in the recording data and a phase of "π" is assigned to a bit of "0". Then, by performing addition of a DC beam, a light intensity of (1+1)=2 is detected for a signal having an amplitude of "1" recorded on the basis of a phase of "0". In addition, a light intensity of (−1+1)=0 is detected for a signal having an amplitude of "−1" recorded on the basis of a phase of "π".

In accordance with this, in the data reproducing unit 14, it is determined that a bit for a data pixel for which a light intensity of "2" has been detected in an image signal from the image sensor 11 is "1" and that a bit for a data pixel for which a light intensity of "0" has been detected is "0". Since such data identification is performed, data based on "0" and "1" recorded on the hologram recording medium 10 can be properly reproduced. Note that, although processing for specifying the position of each data pixel in an image signal obtained at the image sensor 11 has not been particularly mentioned in the above explanation, in the case of performing such position specification, as a general technique that has been conventionally performed, inserting specific pattern data called sync into recorded data is performed. In this case, the data reproducing unit 14 performs processing of searching for a sync portion as the specific pattern from the image signal supplied from the image sensor 11 and specifying the position of each data pixel on the basis of the position of the sync detected as a result.

As such a technique for specifying the position of each data pixel, a method regarded as being most suitable, such as a technique that has been suggested or a technique that will be suggested in the future, can be adopted in an appropriate manner. Such a technique should not be particularly limited here.

In addition, after the position of each data pixel is specified as described above, processing for acquiring values (amplitude values) of the individual data pixels is performed. For example, conventionally, interpolation processing is performed in accordance with values neighboring the specified positions of the individual data pixels and the amplitude values of the individual data pixels are obtained by calculation. This is a general technique in the area of image processing, and a Bi-linear interpolation method, a Cubic convolution method, a Bicubic spline method, and the like are known. In addition, a Nearest neighbor method for selecting a signal value whose timing is nearest from the specified position, as the amplitude value of the data pixel, without performing calculation, is also available.

Various techniques can also be adopted as such processing of obtaining an amplitude value. Such various techniques are not particularly limited here.

As described above, according to this embodiment, by performing only spatial light phase modulation as spatial light modulation corresponding to recording data, data recording onto the hologram recording medium 10 can be performed in accordance with information on phases. In addition, at the time of reproduction, by performing reading in which a DC beam is applied together with a reference beam, data recorded on the hologram recording medium 10 in accordance with information on phases can be correctly reproduced.

In addition, since a DC beam is applied at the time of reproduction, compared with a conventional case where reading is performed by applying only a reference beam, the amount of reproduction beam can be increased. Thus, stabilization of data detection can be achieved, and improvement in reproduction performance can be achieved.

Second Embodiment

Then, a second embodiment will be described.

Figure 8:
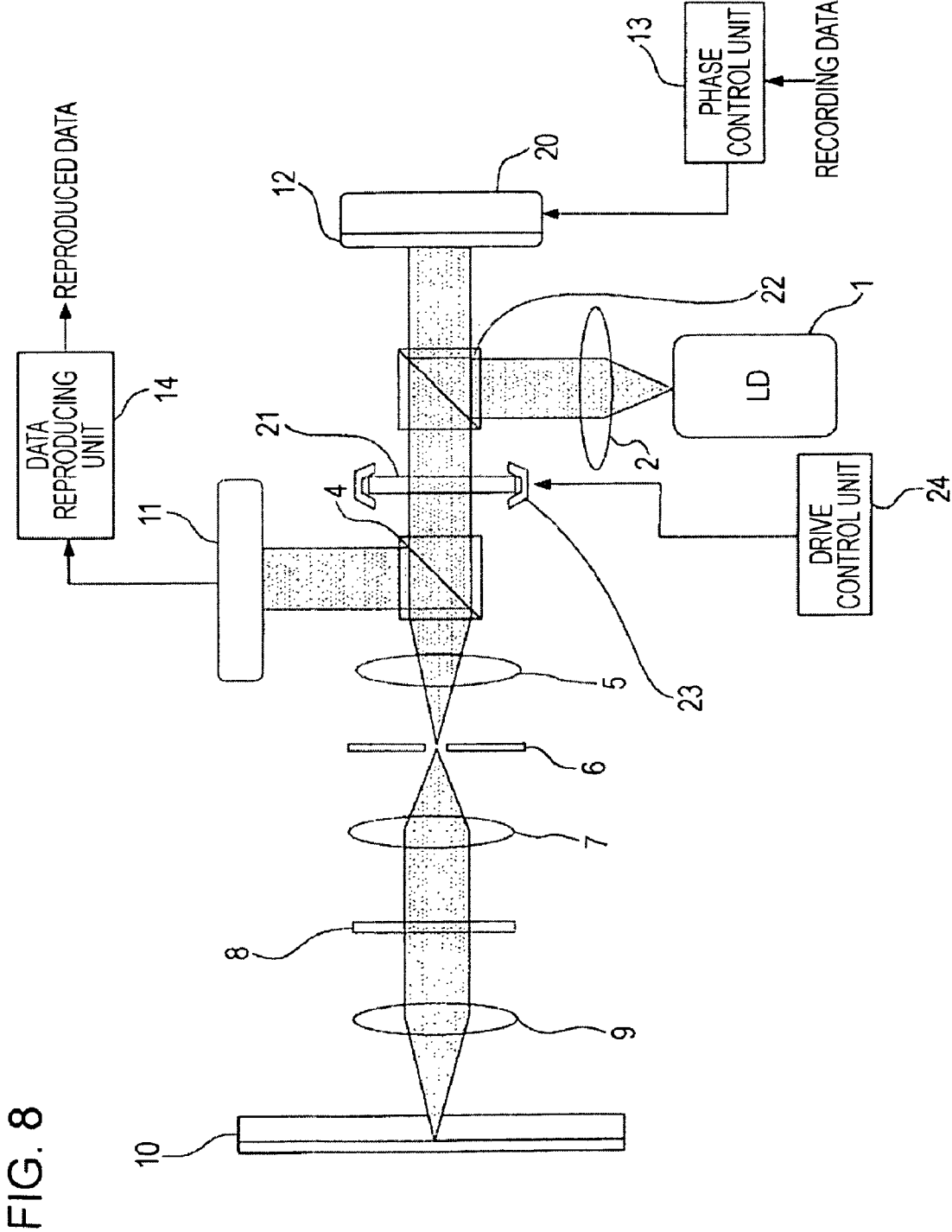
FIG. 8 is an illustration showing the internal configuration of a recording and reproducing device according to a second embodiment.

FIG. 8 shows the internal configuration of a recording and reproducing device according to the second embodiment. Note that, also in FIG. 8, only the configuration of an optical system of the recording and reproducing device is mainly extracted and shown as in FIG. 1, which has been provided above, and the other portions are omitted. In addition, in FIG. 8, portions that have been explained in the first embodiment are represented by the same marks and explanations thereof will be omitted.

In the recording and reproducing device according to the second embodiment, as a phase modulator that performs spatial light phase modulation on a picture element-by-picture element basis, instead of the phase modulator 3 of a transmission type used in the first embodiment, a phase modulator of a reflection type (reflection-type phase modulator 20) is used. As a phase modulator of a reflection type, a phase modulator using FLC (Ferroelectric Liquid Crystal) is known. As the reflection-type phase modulator 20 in this example, for example, a phase modulator constituted by the FLC is also used.

In order to deal with the use of the reflection-type phase modulator 20 as a phase modulator as stated above, in the recording and reproducing device in this case, a beam splitter 22 configured to receive light emitted from the laser diode 1 and acquired through the collimator lens 2 as shown in the figure is added. The beam splitter 22 is provided so as to reflect incident light from the collimator lens 2 so that the light is guided toward the reflection-type phase modulator 20-side and to cause the reflected light from the reflection-type phase modulator 20 to pass through the beam splitter 22 so that the reflected light is guided to the beam splitter 4 through a phase element 21, which will be described later.

Note that, since the configuration of stages subsequent to the beam splitter 4 is similar to the case shown in FIG. 1, which has been provided above, repetitive explanations thereof will be omitted.

In addition, as in the case of the first embodiment, the mask element 12 is attached to the reflection-type phase modulator 20. Similarly to the phase modulator 3, the reference beam area A1, the signal beam area A2, and the gap area A3 are set in advance in the reflection-type phase modulator 20. Also in this case, the mask element 12 is installed on an incidence/emission surface side for laser beams of the reflection-type phase modulator 20 in such a manner that the reference beam area A1, the signal beam area A2, and the gap area A3 set in the mask element 12 correspond to the reference beam area A1, the signal beam area A2, and the gap area A3 set in the reflection-type phase modulator 20, respectively.

In addition, a driving signal from the phase control unit 13 is supplied to the reflection-type phase modulator 20. The reflection-type phase modulator 20 is also configured such that an internal liquid crystal element (each picture element) is controlled to be driven in accordance with the driving signal and the phase control unit 13 thus performs phase modulation on incident light.

Here, as a phase modulator of a reflection type including the above-mentioned FLC, it is considered that ensuring a dynamic range sufficient for phase modulation is very difficult in the present situation. Specifically speaking, it is considered that performing fine phase modulation, such as "$\pi/2$", as in the phase modulator 3 of a transmission type used in the first embodiment is very difficult. Thus, in the present situation, the limit of phase modulation that can be handled by a phase modulator of a reflection type is phase modulation in units of $\pi$.

As described above, if the limit of phase modulation is phase modulation in units of $\pi$ and, unlike the case of the first embodiment, phase modulation in units of $\pi/2$ cannot be performed, a phase difference of $\pi/2$ cannot be provided between the reference phase of a reference beam and the phase of a DC beam only by modulation using a phase modulator. Thus, addition and reading of the DC beam cannot be properly performed.

Thus, in the second embodiment, only a function of generating a reference beam and a signal beam in accordance with phase modulation based on "0" and "$\pi$" is assigned to the reflection-type phase modulator 20, and phase modulation (provision of a phase difference) based on "$\pi/2$", which is necessary at the time of reproduction, is assigned to the phase element 21.

The phase element 21 is configured to include a phaser (phase plate) having an anisotropy corresponding to a polarizing direction, which is used as a wavelength plate or the like in the area of, for example, optical discs.

Here, as is commonly known, such a phaser is configured to modulate the phase of incident light having a polarizing direction of an optical axis direction with respect to the orthogonal direction thereof by a certain amount. That is, from the above description, by setting the optical axis direction of a phaser to a direction corresponding to the polarizing direction of incident light, phase modulation by a certain amount can be applied to light passing through the phaser.

Figure 9:
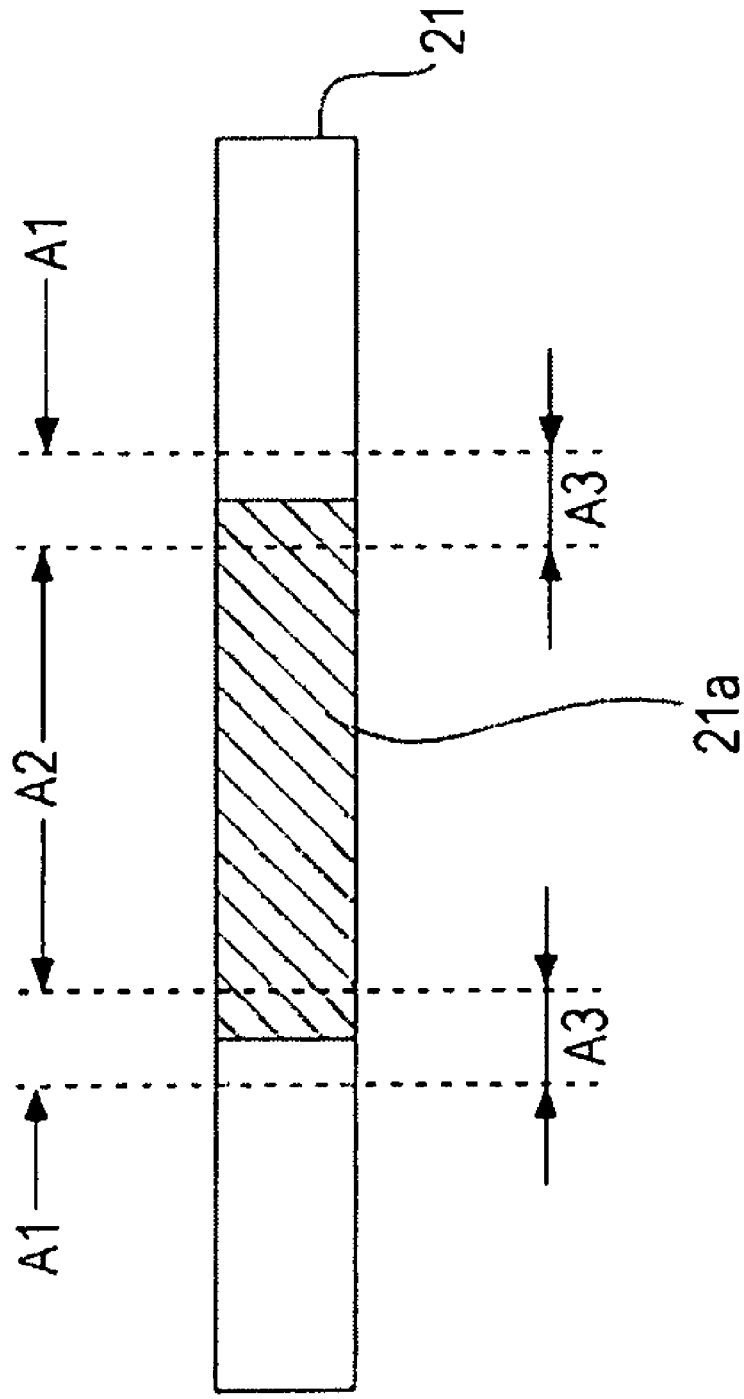
FIG. 9 is an illustration showing the configuration of a phase element provided in the recording and reproducing device according to the second embodiment.

FIG. 9 shows a cross-sectional structural drawing of the phase element 21 configured by using such a phaser.

As shown in FIG. 9, as the phase element 21, as shown by an oblique-line part in the figure, an area corresponding to the signal beam area A2 is set as a phase difference provision area 21*a* constituted by the phaser. Note that, in the description below, the phase difference provision area 21*a* may be referred to as a phaser 21*a*. In addition, areas other than the phase difference provision area 21*a* are formed of a material having a transparency such as, for example, a glass material or the like.

In this case, the diameter of the phase difference provision area 21*a* is, at least equal to or larger than the diameter of the signal beam area A2 and smaller than or equal to the inside diameter of the reference beam area A1. That is, from the above description, a certain amount of phase difference can be provided between a beam passing through the signal beam area A2 and a beam passing through the reference beam area A1 of the reflection-type phase modulator 20.

In the case of this example, the phaser 21*a* is configured in such a manner that in a case where the optical axis direction of the phaser 21*a* is set to a direction corresponding to the polarizing direction of incident light, a phase difference of $\pi/2$ is provided between a beam passing through an area that is more outward than the phaser 21*a* and a beam passing through the phaser 21*a*. In this case, it is configured such that the phase of a beam passing through the phaser 21*a*-side is delayed by $\pi/2$. That is, it is configured such that in a case where the phase of a beam passing through an area that is more outward than the phaser 21*a* is set to "0", the phase of a beam passing through the phaser 21*a* is set to "$\pi/2$".

However, if a phase difference of $\pi/2$ is always provided between a beam passing through the signal beam area A2 and a beam passing through the reference beam area A1 by the phaser 21, a phase difference based on this $\pi/2$ is provided also at the time of recording. Thus, addition and reading of a DC beam as in the above-described embodiment is not effectively performed.

Thus, by causing the phase element 21 to be driven to rotate by 90 degrees between the time of recording and the time of reproduction, for example, provision of a phase difference by the phase element 21 (phaser) is performed only at the time of reproduction. To this end, in the recording and reproducing device shown in FIG. 8, a rotation drive unit 23 and a drive control unit 24 for controlling a rotation operation by the rotation drive unit 23 are provided.

In FIG. 8, the rotation drive unit 23 holds the phase element 21 and includes rotation means such as, for example, a motor. In accordance with driving force for rotation by this rotation means, the rotation drive unit 23 drives the phase element 21 to rotate. In addition, the installation position of the rotation drive unit 23 is set in such a manner that a beam passing through the signal beam area A2 of the reflection-type phase modulator 20 is output only through the phaser 21a in a state where the rotation drive unit 23 holds the phase element 21 as stated above.

In addition, as a stopper for the rotation operation of the phase element 21, a stopper for attaining a state where the optical axis direction of the phaser 21a corresponds to the polarizing direction of incident light and a state that is obtained by rotation by 90 degrees from the above-mentioned state is provided. It is designed such that control based on a correct rotation angle can be performed by this stopper.

The drive control unit 24 controls the rotation drive unit 23 so that the phase element 21 is rotated by 90 degrees between the time of recording and the time of reproduction. Specifically, at the time of recording, the drive control unit 24 rotates the phase element 21 so that the optical axis direction of the phaser 21a corresponds to the polarizing direction of incident light to the phaser 21a by controlling the rotation direction of the motor in the rotation drive unit 23. In addition, at the time of reproduction, the drive control unit 24 rotates the phase element 21 by 90 degrees from the state at the time of recording by rotating the motor in a direction opposite to that at the time of recording.

Since such rotation control of the phase element 21 at the time of recording/reproduction is performed, a phase difference is not provided between a signal beam and a reference beam at the time of recording, and a normal recording operation as in the case of the above-described first embodiment can be performed. In addition, at the time of reproduction, by providing a phase difference of $\pi/2$ between a beam (DC beam) obtained through the signal beam area A2 of the reflection-type phase modulator 20 and a beam obtained through the reference beam area A1, a DC beam based on a phase difference of $\pi/2$ with respect to the reference phase within the reference beam can be generated.

Here, in order to deal with execution of phase modulation in units of $\pi/2$ by the phase element 21, the phase control unit 13 in this case performs control, at the time of reproduction, such that each picture element within the signal beam area A2 has a phase of "0". Specifically, at the time of reproduction, the mapping section 16 within the phase control unit 13 in this case generates data patterns of the entire effective picture elements of the reflection-type phase modulator 20 in which the reference beam area A1 of the reflection-type phase modulator 20 is set to the same pattern of "0" and "$\pi$" as that at the time of recording and all the phases within the signal beam area A2 are filled with "0" (also in this case, phases in the gap area A3 and an area that is more outward than the reference beam area A1 are set to "0"), and indicates driving signal levels of the individual picture elements to the phase modulation driver 17 in accordance with the data patterns.

In addition, for the sake of confirmation, the reflection-type phase modulator 20 performs only phase modulation based on "0" and "$\pi$". Thus, as driving signals to be supplied to the reflection-type phase modulator 20, only two types, ON level and OFF level, are used. Thus, as indication levels from the mapping section 16 to the phase modulation driver 17 in this case, "0" is set for a phase of "0" and "1" is set for a phase of "$\pi$".

By the recording and reproducing device according to the second embodiment as described above, even in a case where a phase modulator, such as the reflection-type phase modulator 20, that is not capable of performing phase modulation in units of $\pi/2$ or smaller is used, a reproducing operation by addition and reading of a DC beam can be realized.

In addition, although the case of a configuration in which the phase element 21 includes the phaser 21a having an anisotropy with respect to incident light so that a phase difference in units of $\pi/2$ is provided has been exemplified in the above description, the phase element 21 may be configured to provide a phase difference in units of $\pi/2$ for a transmission beam in accordance with, for example, a difference in cross-sectional thickness. Specifically, in a case where the phase element 21 in this case is formed of, for example, a glass material and provides a phase difference of, for example, "$\pi/2$", a difference t in cross-sectional thickness should be set to $t=\lambda/\{4(n-1)\}$, where the refractive index of the glass material is represented by n and the wavelength of the incident light is represented by $\lambda$.

Alternatively, the phase element 21 may be configured to provide a specific phase difference in accordance with a difference in optical path length based on a difference in refractive index.

In addition, in a case where the phase element 21 is configured to provide a phase difference in accordance with a difference in cross-sectional thickness or a difference in refractive index, by inserting the phase element 21 into an optical path only at the time of reproduction, advantages similar to those attained in the case of the configuration shown in FIG. 8, which has been provided above, can be attained. Thus, as driving means for the phase element 21 in this case, for example, driving means configured so as to be capable of inserting and removing the phase element 21 to and from an optical path, such as driving means for slide-driving the phase element 21, is provided.

In addition, a case where the phase element 21 is configured in such a manner that the phase of a beam passing through the signal beam area A2 is delayed by $\pi/2$ has been exemplified in the above description. However, on the contrary, a phase delay of $\pi/2$ may be provided for a reference beam side.

Here, in a case where a phase delay of $\pi/2$ is provided for a reference beam side, the reference phase within the reference beam is $\pi/2$. Thus, in accordance with this, "$\pi$" should be assigned as a phase to be provided for the signal beam area A2 in the reflection-type phase modulator 20. Accordingly, the same phase, the reference phase of a reproduction beam="$\pi$" and the phase of a DC beam="$\pi$", can be obtained.

In addition, a case where phase modulation (phase difference provision) by the phase element 21 is performed at the time of reproduction has been described. However, on the contrary, it may be configured such that phase modulation by the phase element 21 is performed at the time of recording.

For example, in a case where a phase delay of $\pi/2$ is provided for a signal beam side at the time of recording, the phase of a signal recorded on the hologram recording medium 10 is shifted by $\pi/2$. In addition, regarding the recording signal, a phase shift of a reproduction beam obtained by applying a reference beam at the time of reproduction is further shifted by $\pi/2$, resulted in being a shift by "$\pi$". Thus, in this case, in order to set the phase of a DC beam to be the same as that of the reproduction beam to which such a phase shift of "$\pi$" is provided, a phase to be provided for the signal beam area A2 in the reflection-type phase modulator 20 should be set to "$\pi$".

Also in a case where phase modulation by the phase element 21 is performed on a recording side as describe above, addition and reading of a DC beam can be effectively performed.

In addition, a case where the insertion position of the phase element 21 is between the beam splitter 22 and the beam splitter 4 has been exemplified, since the phase element 21 is spatially divided in accordance with the reference beam area A1 and the signal beam area A2 set in the reflection-type phase modulator 20 in order to provide a specific phase difference between a beam passing through the entire reference beam area A1 and a beam passing through the entire signal beam area A2, the following two insertion positions are possible.

A real image plane or the vicinity of the real image plane of the reflection-type phase modulator 20 (add a relay lens optical system according to need)

The Position Between a Collimated Laser Beam and the Reflection-Type Phase Modulator 20

That is, according to the conditions, the insertion position of the phase element 21 can be set to, for example, a position between the reflection-type phase modulator 20 and the beam splitter 22, a position between the relay lens 7 and the objective lens 9, or a position between the collimator lens 2 and the beam splitter 22.

However, for example, in a case where the insertion position is set between the reflection-type phase modulator 20 and the beam splitter 22 as described above, since a laser beam passes through the phase element 21 twice in such a manner that the laser beam reciprocates, the phase element 21 in this case is configured so as to provide a phase difference of "π/2" in accordance with such twice transmission.

In addition, as is understandable from the above description, it is only necessary for the phase element 21 to be configured so as to be capable of performing phase modulation (phase difference provision) at least in units of π/2 or smaller for incident light. Specifically, in a case where the phase element 21 is inserted between the reflection-type phase modulator 20 and the beam splitter 22 as described above, it is only necessary for the phase element 21 to be configured so as to be capable of providing a phase difference in units of π/4 for incident light.

3-3. Third Embodiment

Then, a third embodiment will be described.

In the third embodiment, a reproducing operation adopting, as a reading technique utilizing addition and reading of a DC beam, a technique called so-called differential detection is performed.

Specifically, in the differential detection, as DC beams to be added to a reproduction beam, a DC beam whose phase is set to the same as the reference phase within the reproduction beam and a DC beam whose phase is set to the reversed phase (a phase difference of π) are sequentially applied, two read results are obtained by adding these DC beams individually to the reproduction beam, and a difference between the results is obtained.

Figure 10:
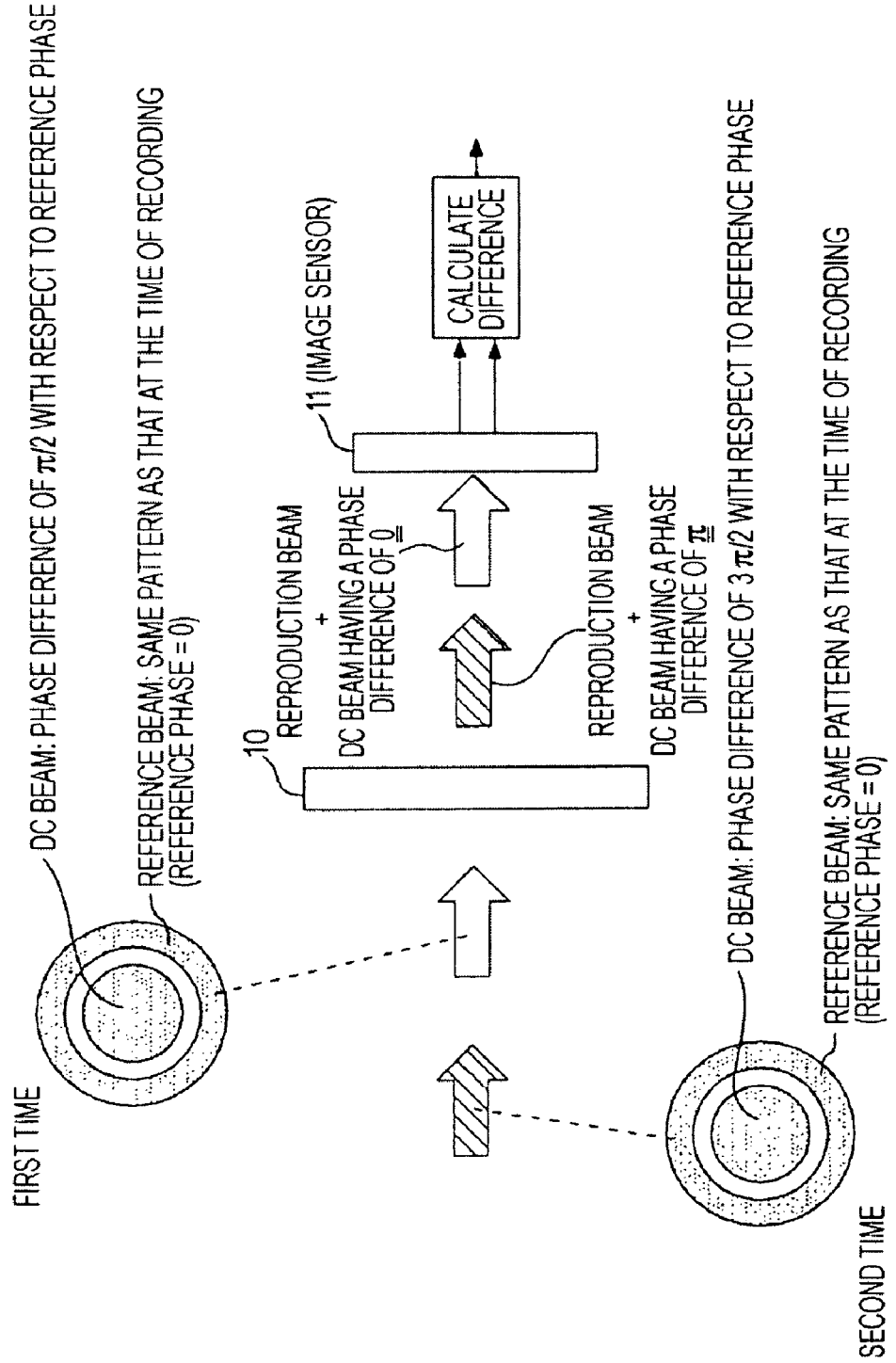
FIG. 10 is an illustration for explaining a reproducing technique based on differential detection (third embodiment).

FIG. 10 schematically shows an overview of an operation at the time of reproduction in a case where such differential detection is performed.

First, also in this case, at the time of reproduction, it is configured such that the same phase modulation pattern as that at the time of recording is provided to a reference beam. That is, the reference phase within the reference beam is set to "0" also in this case.

Differential detection is performed in such a manner that two reading operations in which phases of DC beams are changed are performed every time data for one hologram page recorded on the hologram recording medium 10 is read. A DC beam applied for the first time is a DC beam similar to that in each of the foregoing embodiments. That is, a DC beam having a phase difference of π/2 with respect to the reference phase within the reference beam is applied.

Thus, at the first reading time, a DC beam having the same phase as the reference phase within a reproduction beam (a phase difference of 0) is added to the reproduction beam. That is, a result obtained by addition of the DC beam serving as a component of an amplitude of "1" for the reproduction beam is read.

Then, at the second reading time, as shown in the figure, the phase of a DC beam is set to a phase whose phase difference with respect to the reference phase within the reference beam is 3π/2. As is understandable from the above description, since the phase of the reproduction beam is shifted by π/2 from the reference phase within the reference beam, a phase difference between the DC beam and the reproduction beam can be set to "π" in accordance with the setting of the phase of the DC beam as described above.

In accordance with this, at the second reading time, a result obtained by adding the DC beam serving as a component of an amplitude of "−1" for the reproduction beam to the reproduction beam is read.

Here, the principle of differential detection will be described with reference to FIG. 11. Note that, in FIG. 11, a signal recorded on the hologram recording medium 10 in accordance with a combination of a beam having a certain light intensity and a desired phase is represented by a signal point with reference to the real axis Re and the imaginary axis Im, as in FIG. 5, which has been provided above. Part (a) of FIG. 11 shows a case where an amplitude a based on a phase of "0" is added to a recorded signal. In addition, part (b) of FIG. 11 shows a case where an amplitude a based on a phase of "π" is added to a recorded signal.

First, in each diagram of FIG. 11, a value of a recorded signal is represented as coordinates (x,y) also in this case.

Here, as a matter of course, a reproduction beam obtained by applying a reference beam reflects the value of a signal recorded on the hologram recording medium 10. In the light of the above description, adding DC beams having a phase difference of 0 and a phase difference of π (an amplitude is a) to the reproduction beam as in the above-described operation corresponds to the fact that the amplitude a based on a phase of "0" and the amplitude a based on a phase of "π" are individually added to a recorded signal (x,y) shown with reference to the real axis Re and the imaginary axis Im, as individually shown in parts (a) and (b) of FIG. 11.

As described also in FIG. 5, which has been provided above, a detection output value (referred to as a value of a sensor output) for a recorded signal by the image sensor 11 is represented as a distance from the coordinates of the recorded signal to the origin. Thus, the value of a sensor output when the amplitude a based on a phase of "0" is added in part (a) of FIG. 11 is represented by c in the figure, and the value of a sensor output when the amplitude a based on a phase of "π" is added in part (b) of FIG. 11 is represented by d in the figure.

In the light of this assumption, when the following definitions are provided, (x,y): a value of a recorded signal on the Re axis and the Im axis a: added amplitudes of phases of "0" and "π"

c: a value of a sensor output after an amplitude based on a phase of "0" is added d: a value of a sensor output after an amplitude based on a phase of "π" is added, in a case where the amplitude a based on a phase of "0" is added as shown in part (a) of FIG. 11, the following relationship is established:

$$c^2 = (x+a)^2 + y^2$$

Similarly, in a case where the amplitude a based on a phase of "π" is added as shown in part (b) of FIG. 11, the following relationship is established:

$$d^2 = (x-a)^2 + y^2$$

As differential detection in this embodiment, a difference between a sensor output of a reproduction beam to which the amplitude a based on a phase of "0" is added as described above and a sensor output of a reproduction beam to which the amplitude a based on a phase of "π" is added as described above is obtained. That is, from the above description, the differential detection corresponds to calculation of a difference between the above-mentioned $c^2$ and the above-mentioned $d^2$, consequently, "$c^2-d^2$". In addition, the result of the calculation is represented as follows:

$$c^2-d^2=\{(x+a)^2+y^2\}-\{(x-a)^2+y^2\}=4ax.$$

As described above, by differential detection, only a value proportional to x is obtained. That is, a value representing only information on an amplitude recorded on the hologram recording medium 10 is obtained.

Note that, although a range restriction regarding the size of an amplitude a to be added is not particularly applied in such differential detection, it is preferable that the value of the amplitude a be larger within the allowable range, as is clear from the fact that $c^2-d^2=0$ is obtained when a=0.

Here, the fact that a value proportional to x is obtained as described above means that in differential detection in this case, in the case of a signal recorded so as to serve as a signal point on the real axis Re, the signal can be correctly read.

As the third embodiment, similarly to each of the foregoing embodiments, recording is performed in accordance with a combination of phases of "0" and "π". That is, coordinates of these recorded signals are (−1,0) and (1,0), and y=0 is met for both the signals. Thus, if only a component proportional to x is correctly obtained by differential detection as described above, the fact that the amplitude of the signal (−1,0) recorded in accordance with a combination of a phase of "π" is a negative component can be correctly detected.

As a result, a recorded signal can be correctly reproduced in accordance with only a difference in phase.

In addition, by differential detection, an improvement effect regarding SNR (S/N ratio) can be further achieved.

Here, in embodiments, since a combination of phases to be recorded is formed by "0" and "π", the value of a signal recorded on the hologram recording medium 10 is (1,0) or (−1,0), as described above. That is, y=0 is obtained for each signal. However, these are ideal values. Actually, an intermediate phase between phases "0" and "π" are generated, and not only a component x but also a component y may be provided. In this case, the fact that a component y is provided means that a sensor output value that is to be represented as a distance from the origin, which should originally be a distance to (x,0), is represented as a distance to a different point (x,y). Thus, it can be understood that a component y is a noise component with respect to a recorded signal.

Meanwhile, in a case where differential detection is performed, only a value proportional to x can be obtained as described above. That is, from the above description, a component y that can be regarded as being a noise component is removed as described above. Thus, as a result, suppression of a noise component occurring in a read signal can be achieved, and an improvement in the SNR can be achieved.

Here, the configuration of a recording and reproducing device to perform the above-described differential detection may be based on either of the configuration of the first embodiment and the configuration of the second embodiment.

For example, in a case where the configuration of the first embodiment is adopted, the operation of the mapping section 16 within the phase control unit 13 is changed as described below. Note that since the operation at the time of recording is similar to that in the first embodiment, the description thereof will be omitted.

At the time of reproduction, the mapping section 16 in this case performs the operation described below every time one hologram page is read in such a manner that the first and second phases of reference beams and DC beams are set as described in FIG. 10, which has been provided above.

First, for the reference beam area A1, the same phase modulation pattern as that at the time of recording is set at the first and second reading times.

After that, as an operation at the first reading time, for the signal beam area A2, a data pattern in which the entire signal beam area A2 is filled with "¼" corresponding to a phase of "π/2" is generated, data patterns of the entire effective picture elements of the phase modulator 3 are generated by adding this data pattern and the phase modulation pattern (data pattern) of the reference beam area A1 together, and the data patterns are supplied to the phase modulation driver 17.

Then, as an operation at the subsequent second reading time, data patterns of the entire effective picture elements of the phase modulator 3 are generated in such a manner that the same pattern as that at the first reading time is set for the reference beam area A1 and a data pattern of the entire signal beam area A2 is changed to "¾" corresponding to a phase of "3π/2", and the data patterns are supplied to the phase modulation driver 17.

In addition, in a case where the configuration of the second embodiment is adopted, the operation of the mapping section 16 at the time of reproduction is changed as described below.

That is, in the case of the second embodiment, since phase modulation in units of π/2 at the time of reproduction is unnecessary, at the first reading time, a data pattern is generated for the signal beam area A2 in such a manner that the entire signal beam area A2 is filled with "0" corresponding to a phase of "0", data patterns of the entire effective picture elements of the reflection-type phase modulator 20 are generated by adding this data pattern and a data pattern of the reference beam area A1 that is the same as that at the time of recording together also in this case, and the data patterns are supplied to the phase modulation driver 17.

In addition, as an operation at the second reading time, data patterns of the entire effective picture elements of the reflection-type phase modulator 20 are generated in such a manner that the same pattern as that at the first reading time is set for the reference beam area A1 and a data pattern of the entire signal beam area A2 is changed to "1" corresponding to a phase of "π", and the data patterns are supplied to the phase modulation driver 17.

As described above, in phase modulation of a DC beam in the reflection-type phase modulator 20, a phase difference with respect to the reference phase of a reference beam at the first reading time is "0" and a phase difference with respect to the reference phase of a reference beam at the second reading time is "π". However, in this case, since phase difference provision in units of π/2 at the time of reproduction by the phase element 21 is performed, as a result, a phase difference between the DC beam and the reference phase of the reference beam becomes "π/2" at the first reading time and "3π/2" at the second reading time. Thus, the phase difference between the reference phase of the reproduction beam and the DC beam can be set to "0" at the first reading time and "π" at the second reading time.

In addition, in a case where differential detection is performed, a configuration for performing data reproduction by calculating a difference between a read result (referred to as a first image signal) of a beam obtained by adding a DC beam having a phase difference of "0" with respect to the reference phase within a reproduction beam to the reproduction beam and a read result (referred to as a second image signal) of a beam obtained by adding a DC beam having a phase difference of "π" with respect to the reference phase of the reproduction beam to the reproduction beam, the results being sequentially obtained by the image sensor 11 every time one hologram page is read, is necessary.

Figure 12:
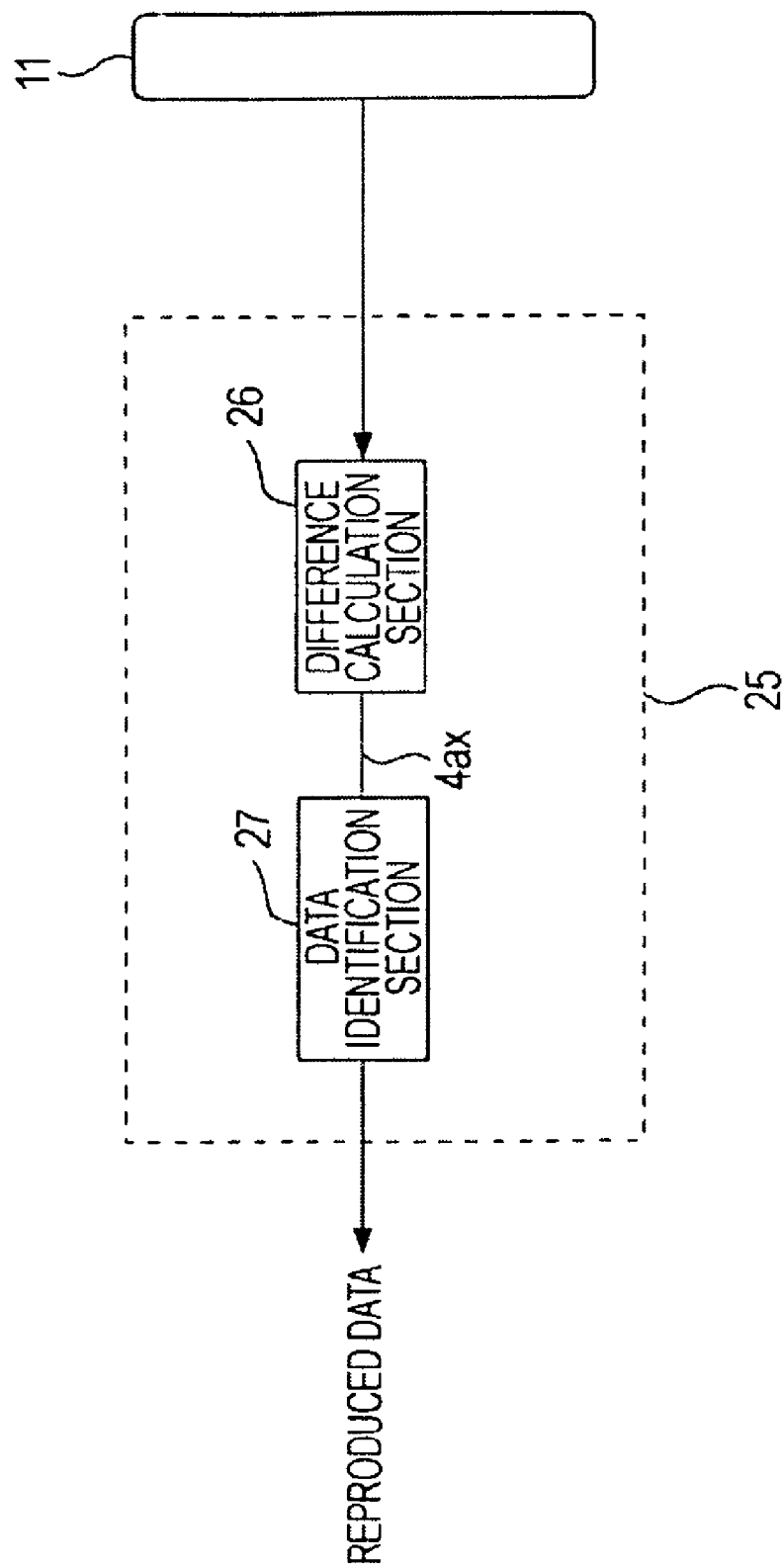
FIG. 12 is an illustration showing the internal configuration of a data reproducing unit to be provided in order to realize differential detection.

As a configuration corresponding to the above, instead of the data reproducing unit 14 used in the foregoing first and second embodiments, a data reproducing unit 25 shown in FIG. 12, which will be provided next, is provided. Note that, in FIG. 12, together with the internal configuration of the data reproducing unit 25, the image sensor 11 is also shown.

In FIG. 12, a difference calculation section 26 and a data identification section 27 are provided in the data reproducing unit 25.

The difference calculation section 26 receives from the image sensor 11 the first image signal and the second image signal obtained every time one hologram page is read as described above, and obtains an image signal as a difference between the first image signal and the second image signal. Specifically, when the value of the first image signal is represented by $c^2$ and the value of the second image signal is represented by $d^2$, by performing difference calculation represented by $c^2-d^2$, an image signal represented by a value 4ax, which has been described above, is obtained.

In addition, the data identification section 27 receives an image signal as a difference calculation result by the difference calculation section 26, and performs data reproduction by performing data identification for identifying whether data is "0" or "1" for each value in units of data pixels of the phase modulator, the value being included in the image signal.

Here, as also described above, the value 4ax, serving as the difference calculation result, correctly represents the polarity of the amplitude of a recorded signal. In this case, since the value of the recorded signal is either of two values, a phase of "0"=an amplitude of "1" and a phase of "π"=an amplitude of "−1", in order to identify the two values, the polarity of the value of each data pixel in the image signal as the difference calculation result is determined. Also in this case, at the time of recording, a phase of "0" is assigned to a bit of "1" and a phase of "π" is assigned to a bit of "0" in recording data as in the first and second embodiments. Thus, in accordance with this, the data identification section 27 identifies a bit in a case where the polarity is positive as "1" and identifies a bit in a case where the polarity is negative as "0". Accordingly, recorded data "0" and "1" can be correctly reproduced.

In addition, although a case where a DC beam and a reference beam are applied at the first reading time in such a manner that the reference phase of a reproduction beam and the phase of the DC beam are the same and a DC beam and a reference beam are applied at the second reading time in such a manner that a phase difference between the reference phase of the reproduction beam and the DC beam is "π" has been exemplified in the third embodiment, these applications may be performed in a reverse order.

Fourth Embodiment

A case where a phase modulation pattern to be provided to the signal beam area A2 at the time of recording is simply set to a pattern in which phases of "0" and "π" are provided in accordance with bit values of recording data has been exemplified in the above description. However, if the arrangement of "0" and "π" within a signal beam is not random in this case, a reduction in the interference efficiency between the signal beam and the reference beam is brought about.

In addition, depending on the ratio of the number of phases of "0"=amplitudes of "1" to the number of phases of "π"=amplitudes of "−1" included in a signal beam, a DC component having a very high signal intensity may be recorded. Specifically, in proportion to the number of amplitudes of "1", a DC component having a very high signal intensity may be recorded.

Here, in general, in hologram recording and reproduction, it is assumed that recording onto the hologram recording medium 10 is performed by multiplexing hologram pages. In the light of the above, a portion where such a DC component is recorded serves as a portion where recording is not performed by superimposing other hologram pages thereon. As a result, recording must be performed with spaces between hologram pages.

Thus, in a fourth embodiment, the number of phases of "0" and the number of phases of "π" included in a signal beam are set to be substantially the same, and suppression in such a DC component is achieved.

Figure 13:
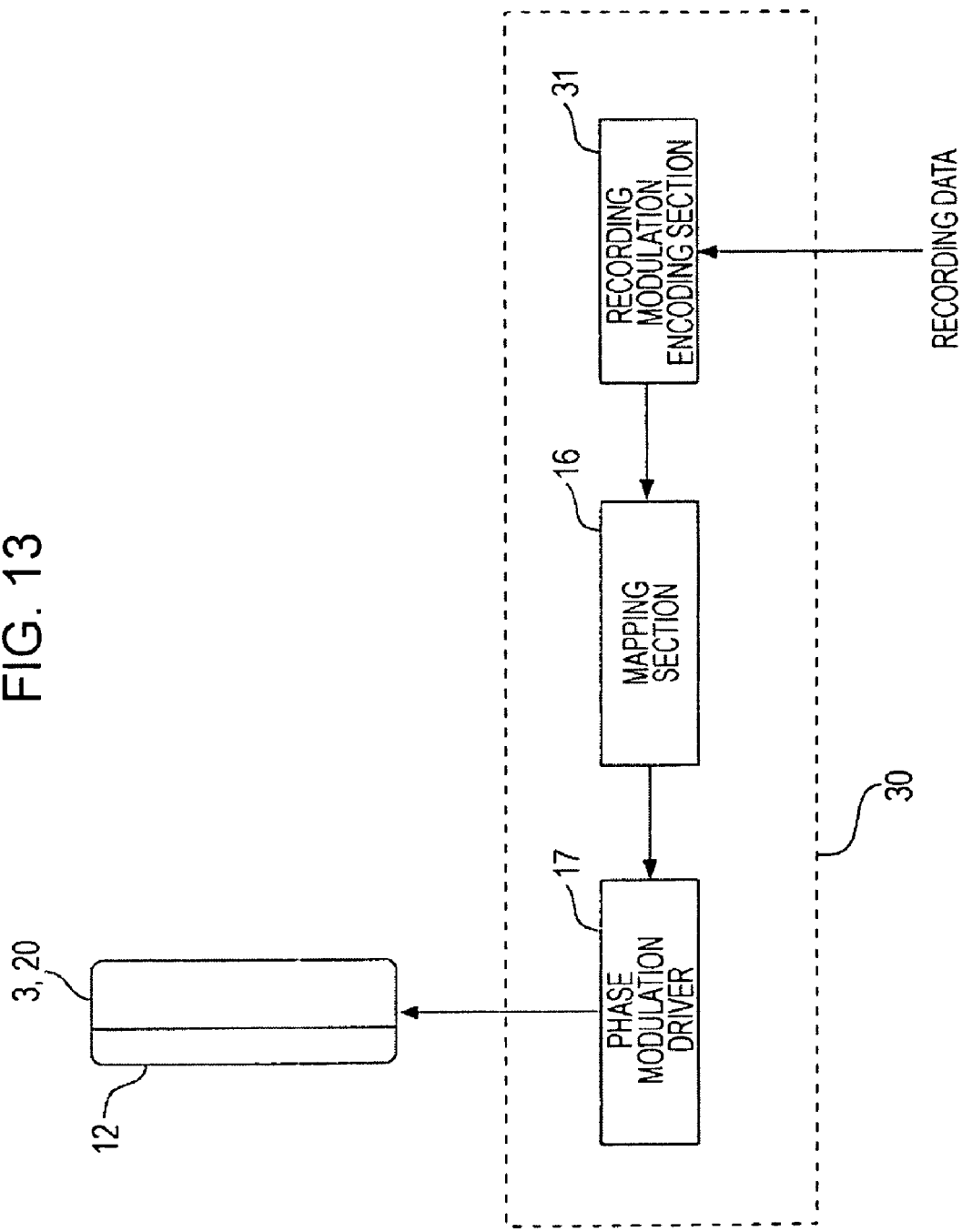
FIG. 13 is an illustration showing the internal configuration of a phase control unit to be provided in order to realize a recording technique (DC-free recording) according to a fourth embodiment.

As a configuration to deal with the above, a phase control unit 30 shown in FIG. 13, which will be provided next, is provided.

In FIG. 13, the phase control unit 30 is provided instead of the phase control unit 13, which is provided in the recording and reproducing device according to the foregoing first to third embodiments. In addition, as the internal configuration of the phase control unit 30, instead of the recording encoding section 15 within the phase control unit 13, a recording-modulation encoding section 31 is provided.

The recording-modulation encoding section 31 converts recording data supplied at the time of recording into a DC-free code on the basis of a modulation encoding table shown, for example, in FIG. 14, which will be provided next. Note that "DC free" referred to here indicates that the number of phases of "0" and the number of phases of "π" are set to be the same.

In FIG. 14, as an example, a modulation encoding table in a case where recording data is converted, for each symbol of the recording data, into a code based on a combination of DC-free four-value phases, where two bits of the recording data are defined as one symbol, is shown. Specifically, as shown in the figure, a combination of phases "00ππ" is associated with a combination of recording data "11" and a combination of phases "0π0π" is associated with a combination of recording data "10". In addition, a combination of phases "0ππ0" is associated with a combination of recording data "01", and a combination of phases "π00π" is associated with a combination of recording data "00".

As described above, the modulation encoding table is configured such that a combination of DC-free phases is associated with each combination of bits of "0" and "1" of recording data in a case where a predetermined number of bits are defined as one symbol. The recording-modulation encoding section 31 converts recording data into a code based on a combination of DC-free phases for each symbol on the basis of such a modulation encoding table.

In addition, although a state in which the value itself of a phase is stored is shown in FIG. 14 for the sake of explanation, combinations of values corresponding to phases "0" and "π" (that is, a phase of "0"="0" and a phase of "π"="½" in the case of the first embodiment, and a phase of "0"="0" and a phase of "π"="1" in the case of the second embodiment) are actually stored.

In FIG. 13, the mapping section 16 in this case also performs, at the time of recording, an operation for mapping of a received code sequence into the signal beam area A2 in accordance with a recording format. Thus, in the signal beam area A2 in this case, mapping is performed in such a manner that the number of values corresponding to a phase of "0" is substantially the same as the number of values corresponding to a phase of "π". By execution of drive control for the phase modulator 3 (or the reflection-type phase modulator 20) by the phase modulation driver 17 on the basis of such a pattern within the signal beam area A2, the number of phases of "0" and the number of phases of "π" within a signal beam can be set to be substantially the same.

By setting the number of "0" and the number of "π" within a signal beam to be substantially the same as described above, phases of "0" and "π" within the signal beam can be arranged at random. Thus, an improvement in the interference efficiency between a reference beam and a signal beam at the time of recording can be achieved. In addition, at the same time, spectra can be spread homogeneously on a Fourier plane (an image on the hologram recording medium 10), and suppression of a DC component within the signal beam can also be achieved.

Here, in a case where recording using a DC-free code is performed as described above, a read DC-free code is decoded into the original binary data of "0" and "1" on the reproducing side.

Specifically, in a case where the fourth embodiment is applied to a case of the configurations of the first and second embodiments, after, with respect to an image signal obtained by the image sensor 11 by addition and reading of a DC beam, identifying whether a phase is "0" or "π" for each data pixel in the phase modulator (3,20) and obtaining a code sequence based on a combination of phases of "0" and "π", the data reproducing unit 14 performs an operation for decoding the code sequence into a data sequence of two values "0" and "1" by using the modulation encoding table shown in FIG. 14.

In addition, in a case where the fourth embodiment is applied to the third embodiment, after, with respect to an image signal supplied from the difference calculation section 26, identifying whether a phase is "0" or "π" for each data pixel in the phase modulator (3,20) and obtaining a code sequence based on a combination of phases of "0" and "π", the data identification section 27 within the data reproducing unit 25 performs an operation for decoding the code sequence into a data sequence of two values "0" and "1" by using the modulation encoding table.

By performing the above-described operations, original recorded data before encoding is performed can be correctly reproduced.

<Modifications>

Although each of the embodiments of the present invention has been described above, the present invention should not be limited to the embodiments described above.

For example, in the above description, since a case where the phase pattern of a reference beam at the time of reproduction is set to be the same as that at the time of recording is assumed, a case where a phase to be provided to the signal beam area A2 at the time of addition and reading of a DC beam described in the first embodiment is set to "π/2" is exemplified. However, in order to realize addition and reading of a DC beam, a phase difference based on "π/2" should be provided between the phase of a reference picture element within the reference beam area A1 and a picture element within the signal beam area A2 so that the reference phase of a reproduction beam and the phase of the DC beam can be set to be the same.

For example, by setting the phase modulation pattern of a reference beam to a pattern in which "0" and "π" are exchanged between the time of recording and the time of reproduction, the reference phase within the reference beam at the time of reproduction can be shifted by "π" from the reference phase within the reference beam at the time of recording.

In a case where the phase modulation pattern of a reference beam at the time of recording is set to be opposite to that at the time of reproduction as described above and the reference phase of the reference beam at the time of reproduction is shifted by "π" from that at the time of recording, the value of a phase to be set for each picture element in the signal beam area A2 in order to perform addition and reading of a DC beam should be set to "3π/2", which is shifted by "π/2" with respect to the reference phase based on "π".

In addition, as the second embodiment employing the phase element 21, a case where the phase pattern of a reference beam at the time of reproduction is the same as that at the time of recording is assumed and, in accordance with this, a phase to be provided to the signal beam area A2 is set to "0". However, also in this case, in order to realize addition and reading of a DC beam, the reference phase of the reproduction beam and the phase of the DC beam should be set to be the same. That is, in the case of the second embodiment, in order to correspond to the fact that phase modulation in units of π/2 by the phase element 21 is performed, a phase difference based on "0" or "π" should be provided between the phase of a reference picture element within the reference beam area A1 and a picture element within the signal beam area A2.

For example, in a case where the phase modulation pattern of a reference beam is not the same as that at the time of recording and the pattern is shifted by "π" to obtain a pattern that is reversed from that at the time of recording as described above, the phase to be provided inside the signal beam area A2 should be set to "π".

In addition, in the second embodiment, the phase element 21 is configured to provide a phase difference of π/2 between a beam passing through the phase difference provision area 21a and a beam passing through an area different from the phase difference provision area 21a. However, instead of this, the phase element 21 may be configured to provide a phase difference of 3π/2. For example, provided that the phase element 21 is configured to provide a phase difference of 3π/2 as described above, in a case where the phase pattern of a reference beam at the time of recording is the same as that at the time of reproduction, a phase to be provided inside the signal beam area A2 should be set to "π". Alternatively, in a case where the reference phase is shifted by "π" by setting the phase modulation pattern of a reference beam to a pattern reversed from that at the time of recording, a phase to be provided inside the signal beam area A2 should be set to "0". As described above, under the conditions that the phase element 21 is configured to provide a phase difference in units of π/2, in order to realize addition and reading of a DC beam, a phase difference based on "0" or "π" should be provided between the phase of a reference picture element within the signal beam area A2 and a picture element within the signal beam area A2.

In addition, in the third embodiment, in accordance with the fact that a case where the phase pattern of a reference beam at the time of recording is set to be the same as that at the time of reproduction is assumed, phases sequentially set in the signal beam area A2 in order to perform differential detection are set to "π/2" and "3π/2" in a case where the configuration of the first embodiment is applied and set to "0" and "π" in a case where the configuration of the second embodiment is applied. However, in order to realize differential detection, a phase difference between the reference phase of the reproduction beam and the DC beam should be set to "0" and "π".

In order to satisfy such conditions, for example, in a case where the configuration in the first embodiment is applied, phase differences based on "π/2" and "3π/2" should be sequentially provided between the phase of a reference picture element within the reference beam area A1 and a picture element within the signal beam area A2. For example, in a case where the phase pattern of a reference beam is set to a pattern reversed from that at the time of recording and the reference phase is shifted by "π" from that at the time of recording, phases to be provided inside the signal beam area A2 should be set to "3π/2" and "π/2".

In addition, in a case where the configuration of the second embodiment is applied, phase differences based on "0" and "π" should be sequentially provided between the phase of a reference picture element within the reference beam area A1 and a picture element within the signal beam area A2. For example, in a case where the phase pattern of a reference beam is exchanged with that at the time of recording and the reference phase is shifted by "π", phases to be provided inside the signal beam area A2 should be set to "π" and "0".

In addition, although, in the above description, a combination of phases to be recorded on the hologram recording medium 10 is set to "0" and "π", recording can be performed in accordance with a combination of other phases.

For example, when a case where phases of "0" and "π/2" are used is assumed, signal values of them are set to (1,0) and (0,1), as shown in FIG. 5, which has been provided above. Since an amplitude of "1" is added in a rightward direction (forward direction) of the Re axis by addition of a DC beam, a phase of "0"=(1,0) becomes (2,0) and a light intensity of "2" is detected, and a phase of "π/2"=(0,1) becomes (1,1) and a light intensity of "√2" is detected. That is, in accordance with a difference between light intensities of "2" and "√2", a difference in recorded phase can be identified, and data reproduction can be performed on the basis of the result.

In addition, although a combination of phases to be recorded can be set in a desired manner only from the point of view of realizing addition and reading of a DC beam as described above, in a case where a difference between phases to be recorded is not sufficiently large, the diffraction efficiency of a reproduction beam in a case where a reference beam is applied is reduced by that amount, and a sufficient reproduction beam amount cannot be obtained. This is because the diffraction efficiency of a hologram (that is a diffraction grating) and a reference beam recorded on a medium becomes maximum when a combination of phases to be recorded exhibits a reverse phase relationship (when a phase difference becomes "π").

Thus, from the above description, in a case where recording is performed in accordance with a combination of phases of "0" and "π" as exemplified in each of the embodiments, prevention of reduction in the reproduction beam amount can be achieved by that amount, and prevention of degradation in the reproduction performance can be achieved.

In addition, in particular, in a case where recording based on a combination of DC-free phases is performed so that suppression of a DC component can be achieved as in the fourth embodiment, if a difference in phase to be recorded is set to be small, a sufficient DC component suppression effect cannot be obtained. That is, in this respect, it is also advantageous in that recording is performed in accordance with a combination of phases of "0" and "π" and a difference between phases each to be recorded is set to "π".

In addition, although a case where the mask element 12 is provided so as to be installed with respect to the phase modulator (3,20) has been exemplified in the foregoing descriptions, the mask element 12 should be inserted at a position that satisfies at least the conditions described below, for the reason similar to that for the phase element 21 described above.

A real image plane or the vicinity of the real image plane of the phase modulator (add a relay lens optical system according to need)

The Position Between a Collimated Laser Beam and the Phase Modulator

For example, in the configuration shown in FIG. 1, the mask element 12 may be inserted between the relay lens 7 and the objective lens 9 or between the collimator lens 2 and the phase modulator 3. In addition, in the configuration shown in FIG. 8, similarly, the mask element 12 may be inserted, for example, between the relay lens 7 and the objective lens 9 or between the collimator lens 2 and the beam splitter 22.

In addition, light-shielding means of the present invention is not necessarily configured as such a single element. For example, the light-shielding means may be realized by applying a material having a light-shielding characteristic to an incidence/emission surface for laser beams of the phase modulator.

In addition, the mask element 12 is configured to shade the gap area A3 and an area that is more outward than the reference beam area A1. However, in a case where, for example, the spot diameter of incident light is adjusted so as to be equivalent to the diameter to the reference beam area A1, it is not necessary to specially shade the area that is more outward than the reference beam area A1. It is only necessary to configure such that only the gap area A3 is shaded.

In addition, from the above description, the mask element 12 is not an essential composition in a case where the gap area A3 is not provided. That is, in a case where, for example, the amount of leakage of light into both the reference beam area A1 and the signal beam area A2 is negligibly small and the gap area A3 can be omitted, light shielding by the mask element 12 is unnecessary. Thus, a configuration in which the mask element 12 is omitted can be provided.

In addition, in the above description, a case where the ring-shaped reference beam area A1 that is concentric with respect to the signal beam area A2 is provided more outward than the round-shaped signal beam area A2 has been exemplified. However, as long as the signal beam area and the reference beam area are arranged so as to be concentric with respect to each other, the shapes of the signal beam area and the reference beam area are not limited to such a combination of a round shape and a ring shape. In addition, the reference beam area may be arranged inward and the signal beam area may be arranged outward.

Figure 15:
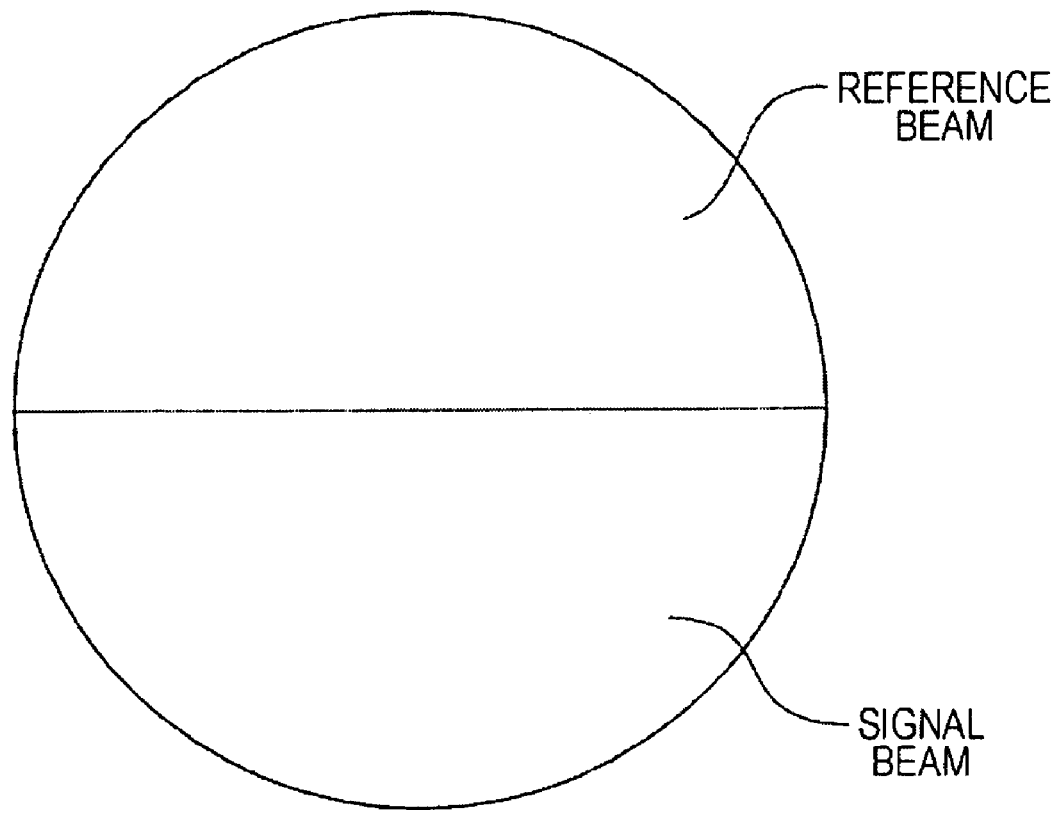
FIG. 15 is an illustration showing an example of a modification of the position relationship between a signal beam and a reference beam.

Alternatively, the reference beam area and the signal beam area may be arranged in a 50:50 division arrangement, as shown in FIG. 15, which will be provided next.

Here, reading/reproducing operations in a case where a reference beam and a signal beam are arranged in a 50:50 division arrangement as described above will be described with reference to FIG. 16, which will be provided next. Note that, in each of part (a) of FIG. 16 and part (b) of FIG. 16, the hologram recording medium 10 and only the beam splitter 4, the objective lens 9, and the image sensor 11 of the configuration of the recording and reproducing device are extracted and shown. In part (a) of FIG. 16, states of a signal beam and a reference beam applied to the hologram recording medium 10 at the time of recording are schematically shown. In part (b) of FIG. 16, a state where a reference beam is applied to the hologram recording medium 10 at the time of reproduction and a reproduction beam obtained from the hologram recording medium 10 in accordance with application of the reference beam is guided to the image sensor 11 is schematically shown.

In addition, in each of the figures, a vertical broken line represents the optical axis of a laser beam.

Figure 16:
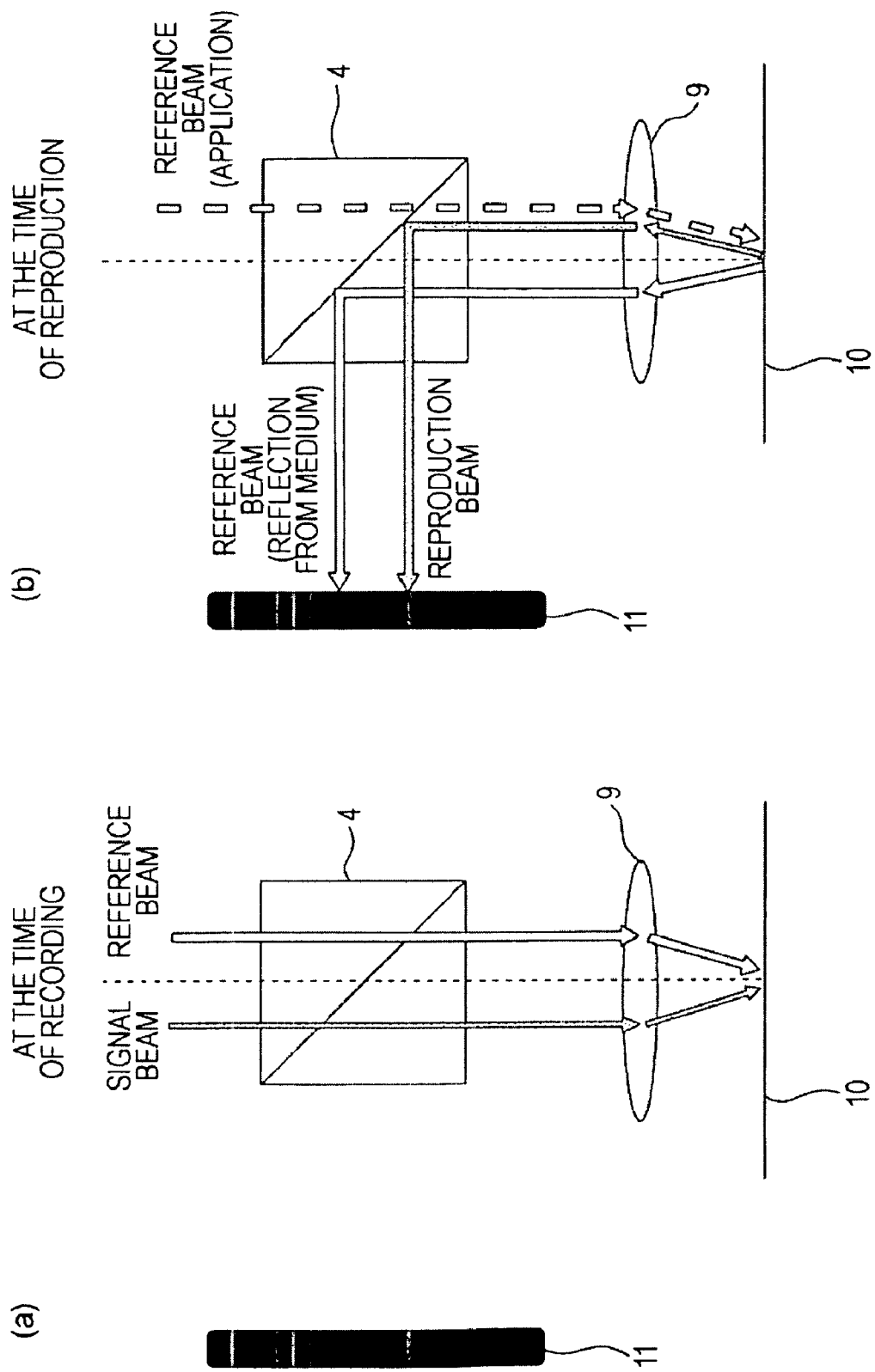
FIG. 16 includes illustrations schematically showing the states of laser beams at the time of recording and reproduction in a case where a signal beam and a reference beam are arranged in a 50:50 division arrangement.

First, in a case where a reference beam and a signal beam are arranged in a 50:50 division arrangement as shown in FIG. 15, which has been provided above, the reference beam and the signal beam are arranged symmetrical to each other about the laser optical axis, as shown in part (a) of FIG. 16. Then, at the time of recording, the reference beam and the signal beam are converged onto the hologram recording medium 10 as shown in the figure, and data can be recorded by using interference fringes of the signal beam and the reference beam.

Meanwhile, at the time of reproduction, by application of a reference beam to the hologram recording medium 10 as shown in part (b) of FIG. 16, a reproduction beam can be obtained. In this case, since the reference beam is applied to the hologram recording medium 10 so as to be arranged only in one semicircle bounded by the laser optical axis shown in the figure, reflected light of the reference beam is caused to be returned to a device side in such a manner that the reflected light passes to an opposite side across the laser optical axis, as shown in the figure. In addition, in accordance with the fact that a signal beam at the time of recording is arranged in a semicircle opposite to the reference beam and recording is performed as shown in part (a) of FIG. 16, the reproduction beam is emitted to a side opposite to a side on which the reflected light of the reference beam is emitted with reference to the laser optical axis, as shown by a colored arrow in the figure. An image of each of the reproduction beam and the reflected light of the reference beam is formed on the image sensor 11 through the objective lens 9→the beam splitter 4. On this occasion, since the reflected light of the reference beam is emitted to a side opposite to the reproduction beam as described above, the reflected light is prevented from becoming a noise component of the reproduction beam on the image sensor 11. That is, in this respect, in principle, data recorded on the hologram recording medium 10 can be properly read.

Figure 17:
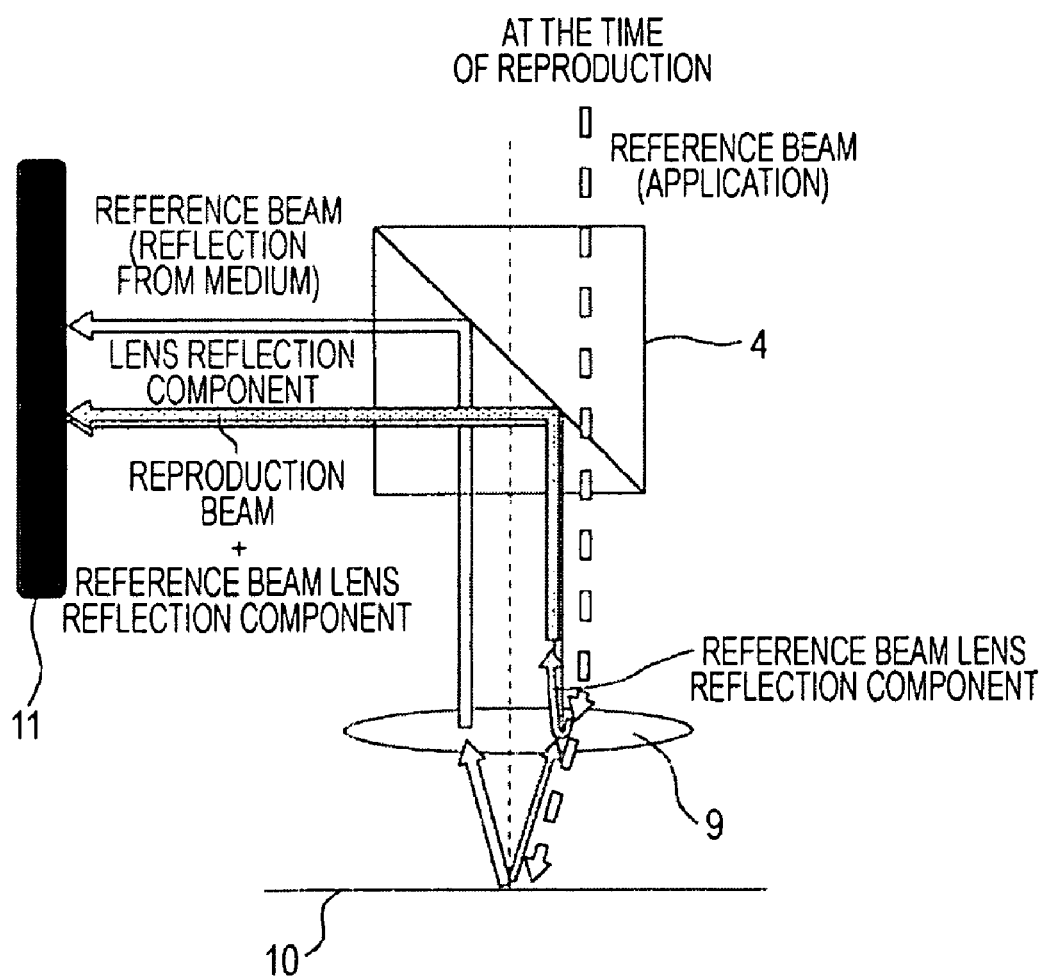
FIG. 17 is an illustration schematically showing a state in which the influence of a lens reflection component of a reference beam generated at the time of reproduction is exerted on a reproduction beam in a case where a signal beam and the reference beam are arranged in the 50:50 division arrangement.
Figure 18:
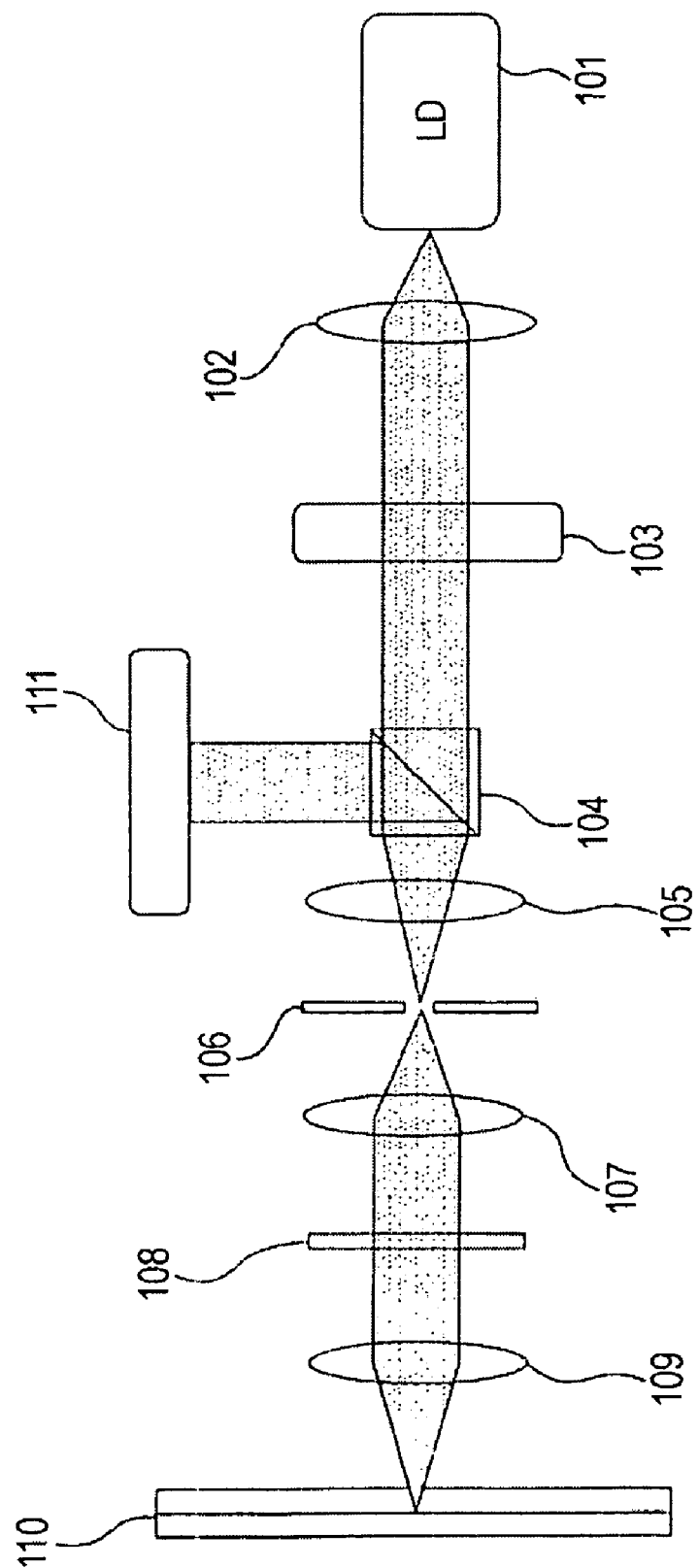
FIG. 18 is an illustration showing the internal configuration of a recording and reproducing device according to a conventional example.
Figure 19:
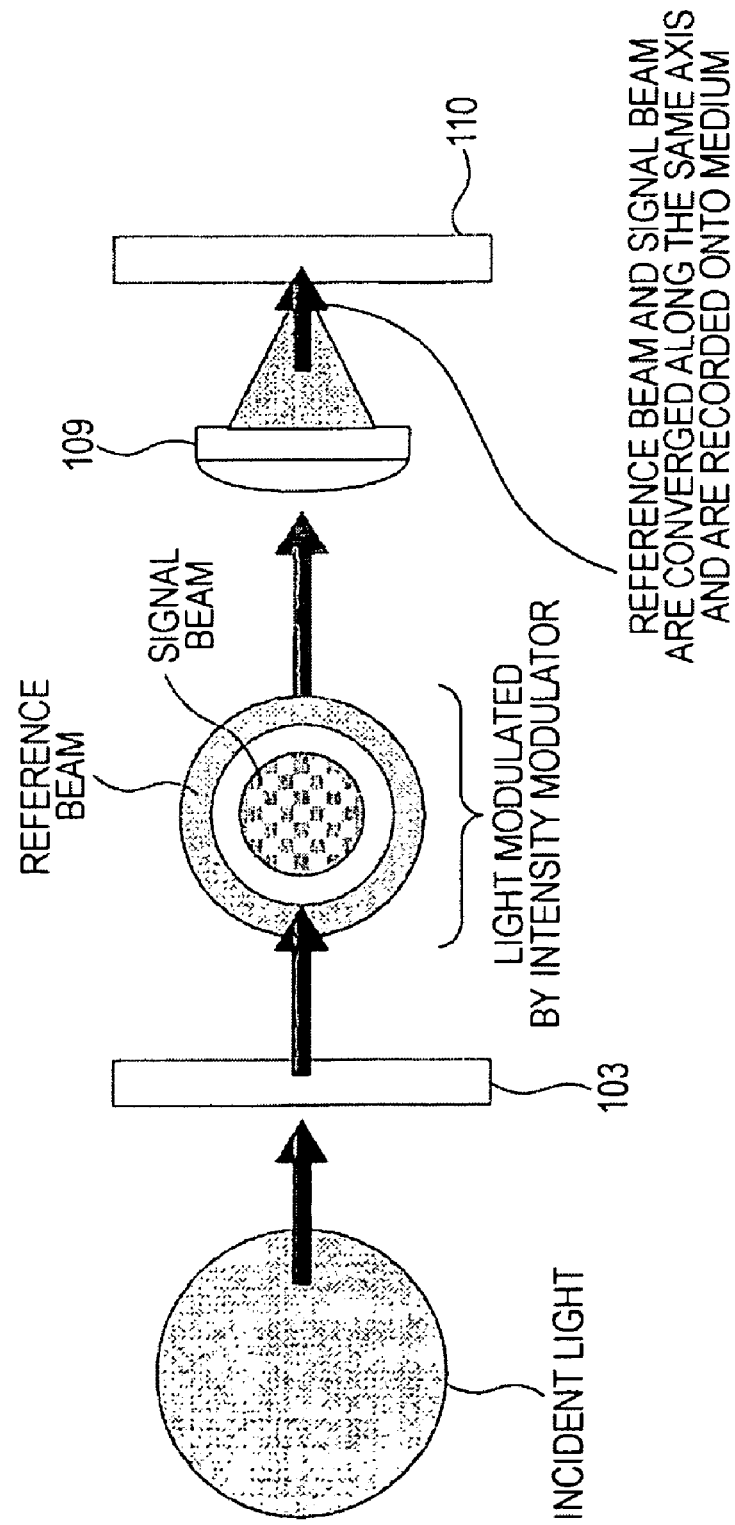
FIG. 19 is an illustration for explaining a conventional recording technique.
Figure 20:
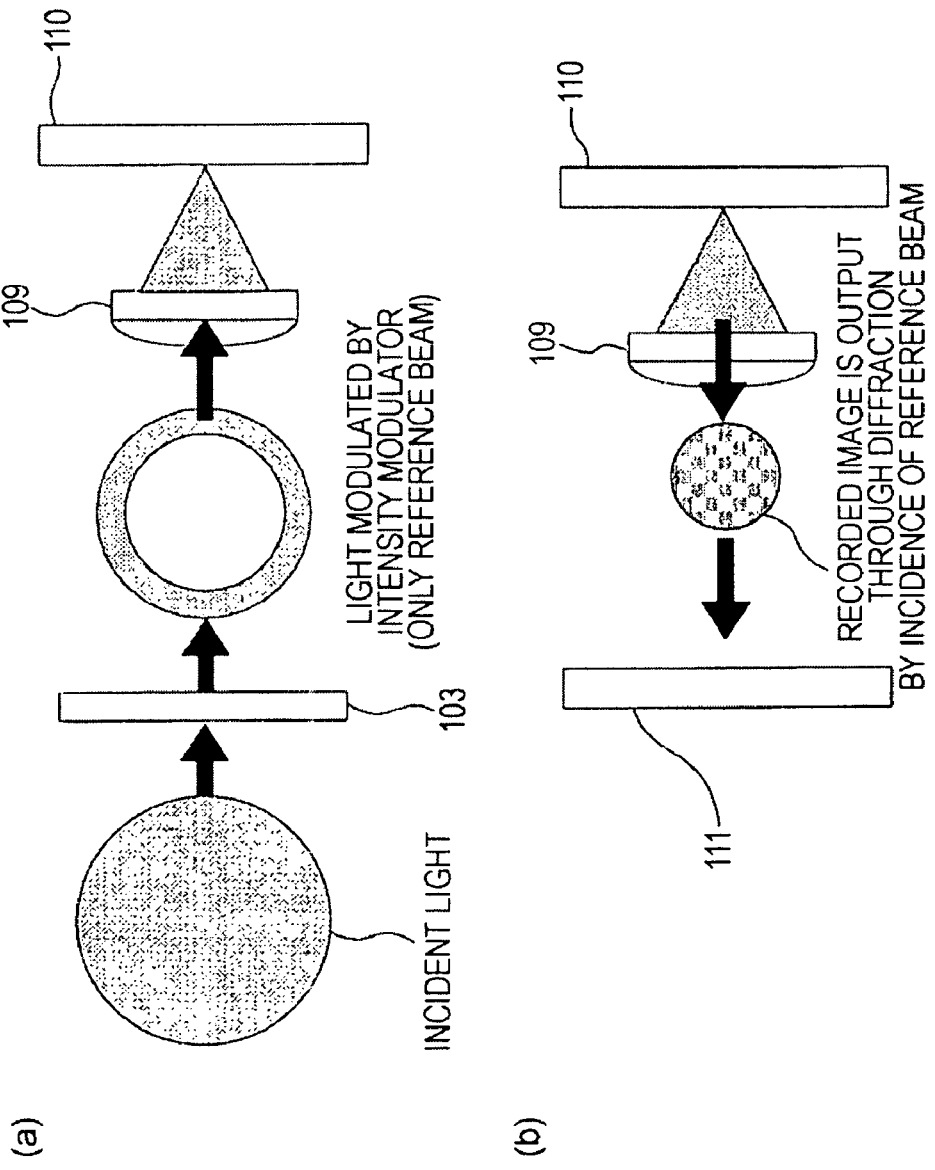
FIG. 20 includes illustrations for explaining a conventional reproducing technique.

However, in a case where a reference beam and a signal beam are arranged in a 50:50 division arrangement is adopted as described above, it must be considered that a lens reflection component of a reference beam shown in FIG. 17, which will be provided next, may serve as a noise component of a reproduction beam whose image is formed on the image sensor 11. That is, a reference beam applied to the hologram recording medium 10 at the time of reproduction is caused to pass through a plurality of lenses, such as the relay lenses 5 and 7 and the objective lens 9 shown in the figure in the process of application. On this occasion, reflected light of the reference beam is generated on surfaces of these lenses.

A reflection component of the reference beam (referred to as a reference beam lens reflection component) generated on a lens surface as described above is generated on the same side as the reproduction beam as shown in the figure. Thus, in this case, the reference beam lens reflection component may be applied so as to be superimposed on the reproduction beam in the image sensor. That is, from the above description, the reference beam lens reflection component serves as a noise component with respect to the reproduction beam. As a result, reading of data recorded on the hologram recording medium 10 may be performed incorrectly.

Under such circumstances, in a case where a recording and reproducing technique of the present invention is applied to a case where a reference beam and a signal beam are arranged in a 50:50 division arrangement, in order to prevent generation of a reference beam lens reflection component, AR (Anti Reflection) coating processing should be performed on the surfaces of respective lens including the objective lens 9.

Note that, for the sake of explanation, in part (b) of FIG. 16, which has been provided above, a state where only a reference beam is applied at the time of reproduction and reading is performed is shown. In a case where a reference beam and a signal beam are arranged in a 50:50 division arrangement as described above, similarly, by applying a DC beam generated through a signal beam area at the time of reproduction, addition and reading of the DC beam and differential detection can also be performed in accordance with the principle similar to that explained in each of the foregoing embodiments.

However, in actuality, even if AR coating processing is performed on lens surfaces as described above, it is very difficult to prevent one hundred percent of lens surface reflection. Actually, the order of reflected light of AR coating commercially available in the present situation is about $10^{-3}$.

Here, in a hologram recording and reproducing method, by interference of a signal beam and a reference beam with an equal intensity (for example, 1:1) at the time of recording, recording of a hologram (diffraction grating) is performed. Then, at the time of reproduction, by application of a reference beam, diffracted light corresponding to the recorded hologram is obtained as a reproduction beam.

Here, in general, the intensity difference (that is, the diffraction efficiency) between the reference beam and a reproduction beam obtained in accordance with application of the reference beam is set to about $1.0 \times 10^{-3}$ ($1/1000$). Thus, from the above description, even if the above-mentioned AR coating processing that is commercially available in the present situation is performed, the amount of light of a reference beam lens reflection component is not suppressed to the same amount as the amount of light of the reproduction beam. That is, in this case, since the intensity of the reproduction beam is equal to the intensity of a noise beam, realistically, reading of recorded data cannot be performed.

Thus, in a case where the above-mentioned 50:50 division arrangement is adopted, AR coating that provides higher efficiency in preventing reflected light compared with the present situation should be performed.

However, in a case where such AR coating processing is performed, there is a concern about an increase in the production cost of each lens. For example, in this respect, it cannot be denied that a technique for arranging a reference beam and a signal beam in a 50:50 division arrangement is problematic from the point of view of practicality.

In the light of the above description, regarding the position relationship between a reference beam area and a signal beam area, it is preferable that the reference beam area and the signal beam area are concentric with respect to each other as exemplified in the embodiments. That is, by arranging the reference beam area A1 and the signal beam area A2 concentrically with respect to each other as described above, both a reference beam and a signal beam have shapes to surround the laser optical axis. Thus, position displacement between applied light and reflected light as in the case of the above-described 50:50 division arrangement can be prevented. In addition, therefore, it is configured such that a reference beam lens reflection component is not superimposed on a reproduction beam. As a result, data reading can be properly performed.

In a case where such a concentric arrangement is provided as described above, advanced AR coating for the case of the 50:50 division arrangement is unnecessary. Thus, a reduction in the production cost of a device can be achieved. In addition, a recording and reproducing device according to the present invention can be realized as a more realistic device.

In addition, although a case where a recording and reproducing device deals with the reflection-type hologram recording medium 10 provided with a reflection film has been exemplified in the foregoing descriptions, the recording and reproducing device can also be suitably applied to a case dealing with a transmission-type hologram recording medium not provided with a reflection film.

In this case, in a reproducing system, the beam splitter 4 for guiding a reproduction beam toward an image sensor side can be omitted. Instead, in this case, since a reproduction beam obtained in accordance with application of a reference beam passes through a hologram recording medium itself, it should be configured such that an objective lens (condenser lens) is further provided on a side opposite to the hologram recording medium when viewed from a laser beam emission point side and a reproduction beam serving as a transmission beam is guided toward an image sensor side through the condenser lens.

For the sake of confirmation, in the case of such a transmission type, the basic recording and reproducing operation itself is similar to that in the case of a reflection type. It is not different from a feature that a reference beam as well as a signal beam is applied and data is recorded onto a hologram recording medium by using interference fringes between the signal beam and the reference beam at the time of recording and that data reproduction is performed by applying a reference beam and a DC beam to the hologram recording medium and detecting the thus obtained reproduction beam and the DC beam by an image sensor at the time of reproduction.

In addition, a case where the present invention is applied to a recording and reproducing device that performs recording and reproduction onto and from a hologram recording medium has been exemplified in the foregoing descriptions. However, the present invention can also be suitably applied to a recording device that is only capable of performing recording and to a reproducing device that is only capable of performing reproduction. In the case of a recording device, a recording technique for performing data recording onto a hologram recording medium in accordance with information on phases by performing phase modulation as spatial light modulation corresponding to recording data can be realized. In addition, in the case of a reproducing device, a reproducing technique capable of reproducing recorded data by reading information on phases recorded on the hologram recording medium can be realized.

In addition, for the sake of confirmation, in the case of a recording device, even if the reflection-type phase modulator 20 in which the minimum unit of phase modulation is $\pi$ is provided, the phase element 21 is not necessarily provided. That is, at the time of recording, phase modulation in units of $\pi/2$ can be made unnecessary.

The invention claimed is:

1. A recording and reproducing device for performing recording and reproduction onto and from a hologram recording medium on which data is recorded by using interference fringes between a reference beam and a signal beam, the device comprising:
    a phase modulation unit configured to include at least a phase modulator performing spatial light phase modulation for incident light on a picture element-by-picture element basis and having a signal beam area serving as an area for generating the signal beam and a reference beam area serving as an area for generating the reference beam set therein and configured to provide a phase difference between a beam passing through the reference beam area and a beam passing through the signal beam area;
    an optical section configured to guide light emitted from a light source and obtained through the phase modulation unit to the hologram recording medium;
    a light-shielding unit configured to be inserted in a specific position in the optical section and to at least shield a beam passing through a gap area between the signal beam area and the reference beam area in the phase modulator; and
    a phase control unit configured to perform phase control for the phase modulator;
    wherein at a time of recording, said phase control unit controls individual picture elements of the phase modulator in such a manner that a phase modulation pattern within the signal beam area is set to a pattern corresponding to recording data and a phase modulation pattern within the reference beam area is set to a specific pattern and for performing, and
    at a time of reproduction, said phase control unit controls the individual picture elements in such a manner that a phase difference of $\pi/2$ is provided as a phase difference between an entire phase of a direct current (DC) beam emitted from the phase modulation unit through the signal beam area and a reference phase within a reference beam emitted from the phase modulation unit through the reference beam area.

2. The recording and reproducing device according to claim 1, wherein
    the phase modulator is configured to perform phase modulation in units of $\pi/2$; and
    the phase control unit, at the time of reproduction, controls the individual picture elements of the phase modulator in such a manner that a phase difference between phases of entire picture elements within the signal beam area and a phase of a reference picture element within the reference beam area is set to $\pi/2$.

3. The recording and reproducing device according to claim 1, wherein
    the phase modulation unit is formed by a combination of
        the phase modulator, which is configured to perform phase modulation in units of $\pi$,
        a phase element configured to have a first area and a second area and configured to provide a phase difference in units of $\pi/2$ or smaller between a beam passing through the first area and a beam passing through the second area,
        a driving unit configured to move the phase element, and
        a drive control unit configured to control the driving unit; and
    said drive control unit controls the driving unit in such a manner that the phase element is moved so that a phase difference is provided between the beam passing through the first area and the beam passing through the second area at any one of the time of recording and the time of reproduction, and
    the phase control unit, at the time of reproduction, controls the individual picture elements of the phase modulator in such a manner that a phase difference between phases of entire picture elements within the signal beam area and a phase of a reference picture element within the reference beam area is set to 0 or $\pi$.

4. The recording and reproducing device according to claim 1, wherein
    the phase control unit performs, as control at the time of reproduction,
    drive control of the individual picture elements in such a manner that the phase difference of $\pi/2$ and a phase difference of $3\pi/2$ are sequentially provided as the phase difference between the entire phase of the DC beam and the reference phase within the reference beam when one hologram page recorded on the hologram recording medium is read; and the device further comprising:
an image detection unit configured to obtain, by receiving the DC beam obtained in two types in accordance with the control by the phase control unit at the time of reproduction and a reproduction beam obtained from the hologram recording medium in accordance with application of the reference beam, two types of image signals in which the DC beam of two types and the reproduction beam are added together, when one hologram page is read, and difference calculation unit configured to calculate a difference between the two types of image signals obtained by the image detection unit when one hologram page is reproduced are provided.

5. The recording and reproducing device according to claim 4, wherein
the phase modulation unit includes,
as the phase modulator, a phase modulator configured to perform phase modulation in units of $\pi/2$; and
the phase control unit performs, as control at the time of reproduction, drive control of the individual picture elements of the phase modulator in such a manner that the phase difference of $\pi/2$ and the phase difference of $3\pi/2$ are sequentially provided between phases of entire picture elements within the signal beam area and a phase of a reference picture element within the reference beam area every time one hologram page is read.

6. The recording and reproducing device according to claim 4, wherein
the phase modulation unit is formed by a combination of
the phase modulator, which is configured to perform phase modulation in units of $\pi$, and
a phase element configured to have a first area and a second area and configured to provide a phase difference in units of $\pi/2$ or smaller between a beam passing through the first area and a beam passing through the second area;
a driving unit configured to move the phase element, and a drive control unit configured to control the driving unit;
the phase control unit performs, as control at the time of reproduction, drive control of the individual picture elements of the phase modulator in such a manner that a phase difference of 0 and a phase difference of $\pi$ are sequentially provided between phases of entire picture elements within the signal beam area and a phase of a reference picture element within the reference beam area every time one hologram page is read; and
the drive control unit controls the driving unit in such a manner that the phase element is moved so that a phase difference is provided between the beam passing through the first area and the beam passing through the second area at any one of the time of recording and the time of reproduction.

7. The recording and reproducing device according to claim 1, wherein
the phase control unit performs, at the time of recording, conversion of the recording data into a code sequence formed by a combination in which the number of phases of 0 and the number of phases of $\pi$ are the same and drive control of individual picture elements within the signal beam area in accordance with the code sequence.

8. The recording and reproducing device according to claim 1, further comprising:
a recording encoding section configured to encode input data into values corresponding to input data phases;
a mapping section configured to arrange, in accordance with the hologram recording medium, the encoded output from the recording encoding section and configured to produce driving signal levels corresponding to individual picture elements; and
a phase modulation driver configured to modulate phase in response to the driving signal levels received from the mapping section.

9. A recording and reproducing method for a recording and reproducing device, serving as a recording and reproducing device for performing recording and reproduction onto and from a hologram recording medium on which data is recorded by using interference fringes between a reference beam and a signal beam, the device including:
a phase modulation unit configured to include at least a phase modulator performing spatial light phase modulation for incident light on a picture element-by-picture element basis and having a signal beam area serving as an area for generating the signal beam and a reference beam area serving as an area for generating the reference beam set therein and to be capable of providing a phase difference between a beam passing through the reference beam area and a beam passing through the signal beam area, and
an optical section configured to guide light emitted from a light source and obtained through the phase modulation unit to the hologram recording medium; and the method comprising:
shielding light by inserting a light-shielding unit in a specific position in the optical section such that at least a beam passing through a gap area between the signal beam area and the reference beam area in the phase modulator is shielded;
performing, at a time of recording, drive control of individual picture elements of the phase modulator in such a manner that a phase modulation pattern within the signal beam area is set to a pattern corresponding to recording data and a phase modulation pattern within the reference beam area is set to a specific pattern; and
performing, at a time of reproduction, drive control of the individual picture elements in such a manner that a phase difference of $\pi/2$ is provided as a phase difference between an entire phase of a direct current (DC) beam emitted from the phase modulation unit through the signal beam area and a reference phase within a reference beam emitted from the phase modulation unit through the reference beam area.

10. The method according to claim 9, the method further comprising:
encoding input data into values corresponding to input data phases;
arranging, in accordance with the hologram recording medium, the encoded output from the encoding, and producing driving signal levels corresponding to individual picture elements; and
modulating phase in response to the driving signal levels.

11. A recording device for performing recording onto a hologram recording medium on which data is recorded by using interference fringes between a reference beam and a signal beam, the device comprising:

a phase modulator configured to perform spatial light phase modulation for incident light on a picture element-by-picture element basis and having a signal beam area serving as an area for generating the signal beam and a reference beam area serving as an area for generating the reference beam set therein;

an optical section configured to guide light emitted from a light source and obtained through the phase modulator to the hologram recording medium;

a light-shielding unit configured to be inserted in a specific position in the optical section and to at least shield a beam passing through a gap area between the signal beam area and the reference beam area in the phase modulator; and a phase control unit configured to perform drive control of individual picture elements of the phase modulator in such a manner that a phase modulation pattern within the signal beam area is set to a pattern corresponding to recording data and a phase modulation pattern within the reference beam area is set to a specific pattern.

12. The recording device according to claim 11, further comprising:

a recording encoding section configured to encode input data into values corresponding to input data phases;

a mapping section configured to arrange, in accordance with the hologram recording medium, the encoded output from the recording encoding section and configured to produce driving signal levels corresponding to individual picture elements; and a phase modulation driver configured to modulate phase in response to the driving signal levels received from the mapping section.

13. A recording method for a recording device, serving as a recording device for performing recording onto a hologram recording medium on which data is recorded by using interference fringes between a reference beam and a signal beam, the device including:

a phase modulator performing spatial light phase modulation for incident light on a picture element-by-picture element basis and having a signal beam area serving as an area for generating the signal beam and a reference beam area serving as an area for generating the reference beam set therein, and an optical section configured to guide light emitted from a light source and obtained through the phase modulator to the hologram recording medium; and the method comprising:

shielding light by inserting a light-shielding unit in a specific position in the optical section such that at least a beam passing through a gap area between the signal beam area and the reference beam area in the phase modulator is shielded; and performing drive control of individual picture elements of the phase modulator in such a manner that a phase modulation pattern within the signal beam area is set to a pattern corresponding to recording data and a phase modulation pattern within the reference beam area is set to a specific pattern.

14. The method according to claim 13, the method further comprising:

encoding input data into values corresponding to input data phases;

arranging, in accordance with the hologram recording medium, the encoded output from the encoding, and producing driving signal levels corresponding to individual picture elements; and modulating phase in response to the driving signal levels.

15. A reproducing device for performing reproduction from a hologram recording medium on which data is recorded by using interference fringes between a reference beam and a signal beam, the device comprising:

a phase modulation unit configured to include at least a phase modulator performing spatial light phase modulation for incident light on a picture element-by-picture element basis and having a signal beam area serving as an area for generating the signal beam and a reference beam area serving as an area for generating the reference beam set therein and to be capable of providing a phase difference between a beam passing through the reference beam area and a beam passing through the signal beam area;

an optical section configured to guide light emitted from a light source and obtained through the phase modulation unit to the hologram recording medium;

a light-shielding unit configured to be inserted in a specific position in the optical section and to at least shield a beam passing through a gap area between the signal beam area and the reference beam area in the phase modulator; and a phase control unit configured to perform drive control of the individual picture elements in such a manner that a phase difference of $\pi/2$ is provided as a phase difference between an entire phase of a direct current (DC) beam emitted from the phase modulation unit through the signal beam area and a reference phase within a reference beam emitted from the phase modulation unit through the reference beam area.

16. The reproducing device according to claim 15, further comprising:

a recording encoding section configured to encode input data into values corresponding to input data phases;

a mapping section configured to arrange, in accordance with the hologram recording medium, the encoded output from the recording encoding section and configured to produce driving signal levels corresponding to individual picture elements; and a phase modulation driver configured to modulate phase in response to the driving signal levels received from the mapping section.

17. A reproducing method for a reproducing device, serving as a reproducing device for performing reproduction from a hologram recording medium on which data is recorded by using interference fringes between a reference beam and a signal beam, the device including:

a phase modulation unit configured to include at least a phase modulator performing spatial light phase modulation for incident light on a picture element-by-picture element basis and having a signal beam area serving as an area for generating the signal beam and a reference beam area serving as an area for generating the reference beam set therein and to be capable of providing a phase difference between a beam passing through the reference beam area and a beam passing through the signal beam area, and an optical section configured to guide light emitted from a light source and obtained through the phase modulation unit to the hologram recording medium; and the method comprising:

shielding light by inserting a light-shielding unit in a specific position in the optical section such that at least a beam passing through a gap area between the signal beam area and the reference beam area in the phase modulator is shielded; and performing drive control of the individual picture elements in such a manner that a phase difference of $\pi/2$ is provided as a phase difference between an entire phase of a DC beam emitted from the phase modulation unit through the signal beam area and a reference phase within a reference beam emitted from the phase modulation unit through the reference beam area.

18. The method according to claim 17, the method further comprising:

encoding input data into values corresponding to input data phases;

arranging, in accordance with the hologram recording medium, the encoded output from the encoding, and producing driving signal levels corresponding to individual picture elements; and modulating phase in response to the driving signal levels.

* * * * *